(12) United States Patent
Igelka et al.

(10) Patent No.: US 12,511,151 B2
(45) Date of Patent: *Dec. 30, 2025

(54) OPTIMIZING REPLICATION-BASED MIGRATION OF VIRTUAL MACHINES

(71) Applicant: Google LLC, Mountain View, CA (US)

(72) Inventors: Or Igelka, Tel Mond (IL); Leonid Vasetsky, Zikhron Yaakov (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,299

(22) Filed: Dec. 12, 2023

(65) Prior Publication Data

US 2024/0111567 A1    Apr. 4, 2024

Related U.S. Application Data

(63) Continuation of application No. 16/934,433, filed on Jul. 21, 2020, now Pat. No. 11,875,169.

(51) Int. Cl.
    *G06F 9/455* (2018.01)
(52) U.S. Cl.
    CPC .. *G06F 9/45558* (2013.01); *G06F 2009/4557* (2013.01); *G06F 2009/45595* (2013.01)
(58) Field of Classification Search
    CPC ................................................. G06F 9/45558
    USPC .............................................................. 718/1
    See application file for complete search history.

(56) References Cited

U.S. PATENT DOCUMENTS

| | | | | |
|---|---|---|---|---|
| 9,047,108 B1* | 6/2015 | Rajaa | ............... | G06F 3/0647 |
| 9,122,765 B1* | 9/2015 | Chen | ............... | G06F 16/972 |
| 9,223,607 B2* | 12/2015 | Kar | ............... | G06F 9/45558 |
| 9,727,429 B1* | 8/2017 | Moore | ............... | G06F 11/1658 |
| 9,977,704 B1* | 5/2018 | Chopra | ............... | G06F 11/0793 |
| 10,264,064 B1* | 4/2019 | Dantkale | ............... | H04L 67/1095 |
| 2010/0250718 A1* | 9/2010 | Igarashi | ............... | G06F 9/5088 |
| | | | | 709/224 |
| 2011/0161491 A1* | 6/2011 | Sekiguchi | ............... | G06F 9/5077 |
| | | | | 709/224 |
| 2012/0284471 A1* | 11/2012 | Hur | ............... | G06F 3/0683 |
| | | | | 711/E12.103 |

(Continued)

FOREIGN PATENT DOCUMENTS

| | | |
|---|---|---|
| CN | 102103524 A | 6/2011 |
| CN | 103425529 A | 12/2013 |
| JP | 2018077846 A | 5/2018 |

OTHER PUBLICATIONS

International Search Report and Written Opinion for International Application No. PCT/US2021/022306 dated Jun. 7, 2021. 17 pages.

(Continued)

*Primary Examiner* — Mehran Kamran
(74) *Attorney, Agent, or Firm* — Lerner David LLP

(57) ABSTRACT

Disclosure is made of methods, apparatus and system for migrating virtual machines (VMs) between source and destination in a computing environment and, more specifically, to replication based migration. VMs migration is controlled so as to manage transferal of data associated with one or more VMs from a source location to a destination location to meet certain user definable or system constraints. Dynamic control and adjustment of system parameters associated with the migration is also disclosed.

17 Claims, 12 Drawing Sheets

(56) References Cited

U.S. PATENT DOCUMENTS

| | | | | |
|---|---|---|---|---|
| 2012/0324183 | A1* | 12/2012 | Chiruvolu | G06F 11/2097 |
| | | | | 711/E12.103 |
| 2014/0033201 | A1* | 1/2014 | Dawkins | G06F 9/45558 |
| | | | | 718/1 |
| 2015/0088825 | A1* | 3/2015 | Bloom | G06F 16/00 |
| | | | | 707/634 |
| 2015/0106802 | A1* | 4/2015 | Ivanov | G06F 9/45558 |
| | | | | 718/1 |
| 2015/0149999 | A1* | 5/2015 | Ramanathan | G06F 9/4856 |
| | | | | 718/1 |
| 2015/0178106 | A1* | 6/2015 | Warszawski | G06F 9/45533 |
| | | | | 718/1 |
| 2015/0205638 | A1* | 7/2015 | Motoki | G06F 9/4856 |
| | | | | 711/162 |
| 2015/0378783 | A1* | 12/2015 | Tarasuk-Levin | G06F 12/08 |
| | | | | 718/1 |
| 2016/0188353 | A1* | 6/2016 | Shu | G06F 9/45558 |
| | | | | 718/1 |
| 2016/0283281 | A1* | 9/2016 | Antony | G06F 3/065 |
| 2017/0316030 | A1* | 11/2017 | Shetty | G06F 11/1464 |
| 2018/0129523 | A1* | 5/2018 | Bryant | G06F 9/45558 |
| 2018/0276085 | A1* | 9/2018 | Mitkar | G06F 3/065 |
| 2019/0324785 | A1* | 10/2019 | Weissman | G06F 9/45558 |
| 2019/0324865 | A1* | 10/2019 | Weissman | G06F 11/1461 |
| 2020/0133502 | A1* | 4/2020 | Yang | G06F 16/184 |
| 2020/0133706 | A1 | 4/2020 | Koehler et al. | |
| 2020/0133718 | A1* | 4/2020 | Koehler | G06F 9/5077 |
| 2020/0387575 | A1* | 12/2020 | Palekar | G06F 12/0868 |
| 2020/0389522 | A1* | 12/2020 | Cherivirala | H04L 67/1095 |
| 2021/0342232 | A1* | 11/2021 | Gopalan | G06F 11/1471 |
| 2021/0382797 | A1* | 12/2021 | Tatiparthi | G06F 11/203 |
| 2024/0111567 | A1* | 4/2024 | Igelka | G06F 9/4856 |

OTHER PUBLICATIONS

International Preliminary Report on Patentability for International Application No. PCT/US2021/022306 dated Feb. 2, 2023. 12 pages.

Office Action for Korean Patent Application No. 10-2021-7030274 dated Sep. 14, 2023. 5 pages.

Office Action for Chinese Patent Application No. 202180002399.5 dated Aug. 16, 2025. 8 pages.

* cited by examiner

600

800

1000

1100

1200

OPTIMIZING REPLICATION-BASED MIGRATION OF VIRTUAL MACHINES

BACKGROUND

Cloud computing involves delivery of on-demand computing services over a network, e.g., a wide area network (WAN) such as for example the Internet and/or one or more local area networks (LANs). It provides information technology infrastructure as a group or groups of networked elements. Such network elements generally provide computing power and data storage to remotely located users via a network and are typically housed in data centers. Machine virtualization is commonly used in cloud computing. A typical virtualized computing system comprises multiple computing nodes that are interconnected by a high-speed network. The computing nodes run Virtual Machines (VMs) that consume physical resources such as Central Processing Unit (CPU), memory, persistent storage and networking resources. Physical resources may reside on one or more network elements, also referred to as hosts.

BRIEF SUMMARY

Aspects of this disclosure provide techniques, apparatus and systems directed to migration of VMs. As an example, the techniques comprise replication-based migration of VMs.

An aspect of the disclosure includes a method for migrating computing resources associated with a virtual machine over a network. The method may comprise determining one or more migration parameters based on one or more performance metrics; and controlling migration processing, with at least one computing device coupled to the network to receive performance metrics associated with at least one of the one or more virtual machines, based on the one or more determined migration parameters so as to control timing of at least one of a memory snapshot, data transfer and a cut-over request associated with migrating computing resources associated with one or more virtual machines.

In accordance with this aspect of the technology, computing resources may comprise a first disk having storage areas associated with memory locations and controlling migration processing may comprise generating at least one command that causes data at a first memory location on the first disk and associated with a first virtual machine of the one or more virtual machines to be transmitted to a second memory location of a second disk. Further, controlling migration processing may also comprise issuing at least one command that causes a second virtual machine to process data stored at the second memory location. In addition, issuing at least one command may be based on a threshold value.

Controlling migration processing may also comprise the at least one computing device generating at least one command that causes data at a first memory location associated with a first virtual machine of the one or more virtual machines to be transmitted to a second memory location.

This aspect of the technology may further comprise receiving a migration request that identifies the one or more virtual machines associated with the computing resources.

Migration parameters may, for example, comprise at least one of a time to execute memory snapshots, a time to instantiate migration of computing resources on a storage medium associated with a given virtual machine, and a time to instantiate cut-over of the given virtual machine.

In addition, this aspect of the technology may comprise outputting at least one of estimated migration completion time, a percentage relating to a volume of data migrated, non-convergence data and a threshold adjustment selection.

Performance metrics may include one or more of snapshot data, compressibility of the computing resources to be migrated, available bandwidth on the network, CBT variance of each of the one or more virtual machines. Performance metrics may also comprise one or more of disk size, disk rewrite rate, cut-over threshold, snapshot duration, and network speed. Another aspect of the technology may comprise a computing system for managing migration of computing resources associated with a virtual machine over a network. The system may comprise one or more computing devices; one or more computer readable storage media; and program instructions, stored on the one or more computer readable storage media, for execution by at least one of the one or more computing devices. The program instructions causing the at least one computing device to: determine one or more migration parameters based on one or more performance metrics; and control migration processing, based on the one or more determined migration parameters so as to control timing of at least one of a memory snapshot, data transfer and one or more cut-over requests associated with migrating computing resources associated with one or more virtual machines.

This aspect of the technology may also comprise a communications interface coupled to the at least one computing device and to a network, the communications interface receiving the one or more performance metrics over the network, the performance metrics associated with the one or more virtual machines.

This aspect of the technology control migration processing may comprise the program instructions causing the at least one computing device to generate at least one command that causes a second virtual machine to process data stored at the second memory location.

Another aspect of the technology may comprise a non-transient computer readable medium containing program instructions, the instructions when executed by one or more computing devices, cause the one or more computing devices to perform the steps of: determine one or more migration parameters based on one or more performance metrics; and control migration processing, based on the one or more determined migration parameters so as to control timing of at least one of a memory snapshot, data transfer and a cut-over request associated with migrating computing resources associated with one or more virtual machines.

DETAILED DESCRIPTION OVERVIEW

Figure 1:
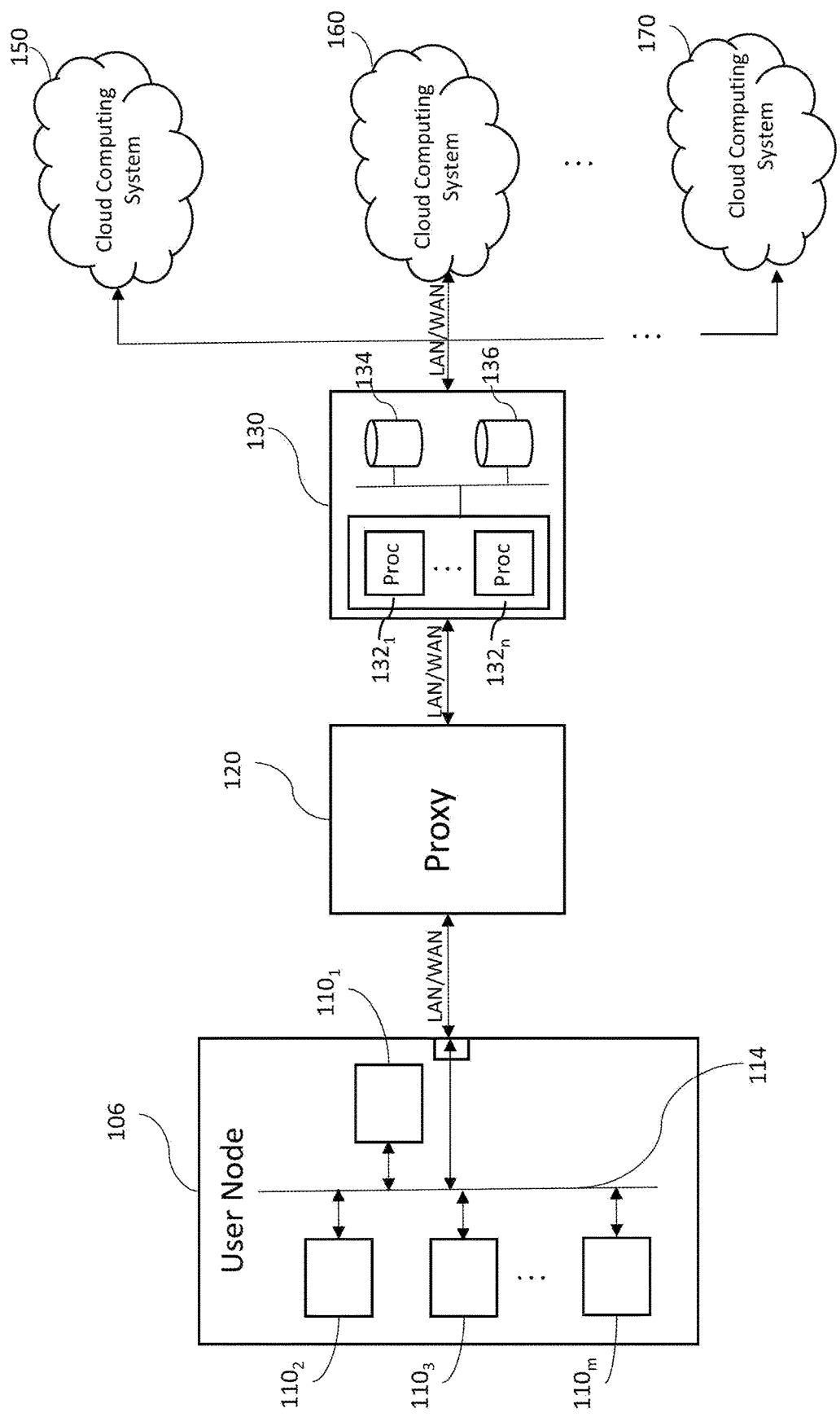
FIG. 1 is a functional diagram of an example system in accordance with aspects of the disclosure.

The technology relates to migrating VMs between a source and a destination in a computing environment and, more specifically, to replication based migration. Migration, or VM migration, generally refers to the act or operation in a computing environment of copying and/or moving a VM from its source location (virtual or physical) to its destination location (virtual or physical). Replication based migration generally refers to migrating a VM by periodically taking snapshots of the VM or data associated with the VM in the source (potentially while the VM is running in the source), and replicating or copying the snapshots (or changes/deltas between snapshots) to the destination. Factors or metrics that are typically considered when migrating VMs include the size of the disk(s) on which data associated with the VM resides, the rewrite rate of the disk(s) (e.g., how fast a given source disk of the VM is being re-written), a cut-over threshold (generally a value that determines when computing operations may be switched to the destination VM), the volume of data that needs to be transferred and/or available bandwidth between the source and destination, as well as other metrics as discussed in detail below. A higher rewrite rate coupled with a strict cut-over threshold typically results in a requirement that more snapshots be taken. Increasing the number of snapshots that may need to be taken and migrated before being ready for cut-over operation may result in a migration wave being never ready for cut-over, i.e., migration non-convergence.

In one instance, an aspect of the disclosed technology comprises a process or program running on a computing device that can determine parameters associated with a migration event, monitor and determine the status of the migration event based on various metrics including those discussed above, and make adjustments to the migration process to meet customer needs (e.g., specific VMs must complete migration around the same time) and mitigate against non-convergence(s). For example, the process may receive as user input information identifying specific VMs and a cut-over threshold for a mass migration event (e.g., migration of multiple VMs.) The process may then determine the disk sizes and rewrite rate for all the VMs identified for migration. Such a determination may involve polling source disks involved in the migration to determine their sizes and rewrite rate. For a given disk size and rewrite rate, the process may then determine the timing of when migration should start for each VM involved in the migration. As part of this determination, the process may take into account the cut-over threshold. For example, the process may determine that given the desired cut-over threshold, disk sizes and rewrite rate, cut-over may never occur, or may not occur in a time frame required by the end user.

In another instance, the process may shorten the time it takes to reach a "ready for cut-over" state for an entire migration wave by reducing the total amount of data that needs to be transferred in order to reach this state. For example, the process may dynamically calculate the timing in which to start the migration of each VM in the current mass migration wave, based on different metrics and measurements that can be performed live, in order to estimate/determine the timing that will probably reduce the amount of data that needs to be transferred from the source to the destination due to the recurrent snapshot taking mechanism of replication-based migration. The disk size, rewrite rate and available bandwidth may be fed back to the process, which may then dynamically adjust the timing of snapshots of VMs in a given migration wave.

In another instance the disclosed technology may be implemented in a backend system that runs a process as described above. Such a system may act as an interface between an end user and VMs provided via a cloud computing environment to that user. The system may take migration requests from the user, implement the migration requests as desired by the user, monitor the migration, provide feedback to the user during migration, and/or adjust migration settings to effectuate the migration and eventual cut-over. Such a system may, for example, allow a user to provide as input the identity of VMs and a cut-over threshold. The system may then provide as output to the user one or more of estimated convergence time, percentage value relating to completeness of the migration wave, probability of non-convergence, options to adjust cut-over threshold, cut-over ready status, and estimated cut-over down time.

In another instance, the system may automatically manage the entire process including determining one or more appropriate cut-over thresholds for identified VMs and initiating cut-over when such a threshold is met. In this instance, a user may identify the target VMs and a time by which the cut-over must be completed, the system would then determine all the appropriate settings and automatically perform cut-over.

In another instance, the system may also dynamically adjust parameters associated with a migration wave or event as part of migration processing. For a given set of VMs targeted for migration, the system may determine or be provided with an initial cutover threshold. The system may then detect performance metrics such as for example disk size, disk rewrite rate, data transfer rate, data compressibility, etc. The detected metrics may then be used to tune or adjust one or more migration parameters such as for example timing of transferring data associated with one or more of the targeted VMs, timing of taking one or more snapshots or timing of when to initiate cut-over. The initial cut-over threshold may also be tuned or controlled based on the detected metrics. For example, if the metrics indicate that the initial cut-over threshold will not result in a timely cut-over, e.g., to meet an end-user request or because of another event such as a data center maintenance event, the initial cut-over threshold may be adjusted or tuned. By detecting metrics and using the detected metrics to control migration, the system allows for monitoring and control of a migration event or wave as such event or wave happens. Once a cut-over threshold is met, the system may, optionally, control actual cut-over by issuing one or more commands that cause actual cutover.

Example Systems and/or Environments

FIG. 1 is an example system 100 in accordance with aspects of the disclosure. System 100 includes a user node 106, proxy node 120, backend system 130, and cloud computing systems 150, 160 and 170 that can communicate over LANs and/or WANs. User node 106 comprises computing devices 110 that are connected via one or more LANs and/or WANs to proxy node 120. User node 106 may comprise an enterprise that makes use of cloud computing services such as Infrastructure as a Service (IaaS), Platform as a Service (PaaS), and/or Software as a Service (SaaS). For example, if a business enterprise, user node 106 may use cloud systems 150, 160 or 170 as a service that provides software applications, e.g., accounting, word processing, inventory tracking, etc., applications, to computing devices 110 used in operating enterprise systems. Alternatively, user node 106 may comprise a collection of one or more computing devices 110 accessing web based applications, e.g., e-mail, banking, video, etc., serviced via cloud computing systems 150, 160 or 170. Computing devices may therefore comprise various client devices such as laptops, desktops smartphones, or any computing device that includes data processing hardware, memory and storage. Computing devices 110 may connect to network 114 through wireless (e.g., WiFi or cellular) or wired (e.g., Ethernet) connections.

User node 106 may be coupled to backend system 130 through proxy node 120. Proxy node 120 typically comprises one or more proxy servers that serve as a gateway between user node 106 and backend system 130. Proxy node 120 is coupled to backend system 130 via one or more LAN and/or WAN connections. Proxy node 120 operates to handle data traffic flow between user node 106 and backend system 130.

Backend system 130 comprises one or more processing devices 132, storage 134 and memory 136. Storage 134 may store instructions used by processing devices 132 to control migration of data within and among cloud systems 150, 160 and 170 or between user node 106, e.g., in an enterprise operation, and one or more of cloud systems 150, 160, and 170. Backend system 130 may be considered a migration controller that interfaces with end user node 106 and cloud computing system 150, 160 or 170 to manage and control a migration event. For example, backend system 130 may receive migration requests from end node 106 that pertain to specific VMs operating in one or more of cloud computing systems 150, 160 or 170. System 130 may then request information from the relevant cloud systems and issue commands based on information it receives from those systems to control timing, cut-over, etc., associated with the migration. In some instances, the backend system 130 may compute output values, e.g., start times for different data migration events, that optimize the data migration process. System 130 may also provide feedback to user node 106 as to the status of migration or provide options that upon selection impact the migration process.

In addition to the embodiment of backend system 130 shown in FIG. 1, another option may be that backend system 130 sends data it collects (e.g., data-plane data as VM disk data, or control-plane data as metrics, rewrite rates, etc.) to a cloud system that manages the migration process, decides what to do with that information from the source/backend, and how to process it. In this regard, it may be desirable to have as much logic as possible or desired in a cloud system with respect to migration control and user-facing information, while having the backend system (e.g., source worker/source agent) do a minimal amount of work (e.g., reading the source VM disks, taking source snapshots, enabling CBT on a source VM, etc.), and for having the backend system to be as seamless and friction free as possible with the customer. More generally, the functions performed by backend system 130 may be distributed between system 130 as shown with FIG. 1 and components within the cloud. It is also possible to implement those functionalities entirely within a given cloud.

Cloud computing systems 150, 160 and 170 may comprise one or more data centers that may be linked via high speed communications or computing networks. A given data center within any one of systems 150, 160, 170 may comprise dedicated space within a building that houses computing systems and their associated components, e.g., storage systems and communication systems. Typically, a data center will include racks of communication equipment, servers/hosts and disks. The servers/hosts and disks comprise physical computing resources that are used to provide virtual computing resources such as VMs. To the extent a given cloud computing system includes more than one data center, those data centers typically will be at different geographic locations, chosen to deliver services in a timely and economically efficient manner, as well provide redundancy and maintain high availability. Similarly, different cloud computing systems are typically provided at different geographic locations.

Figure 2:
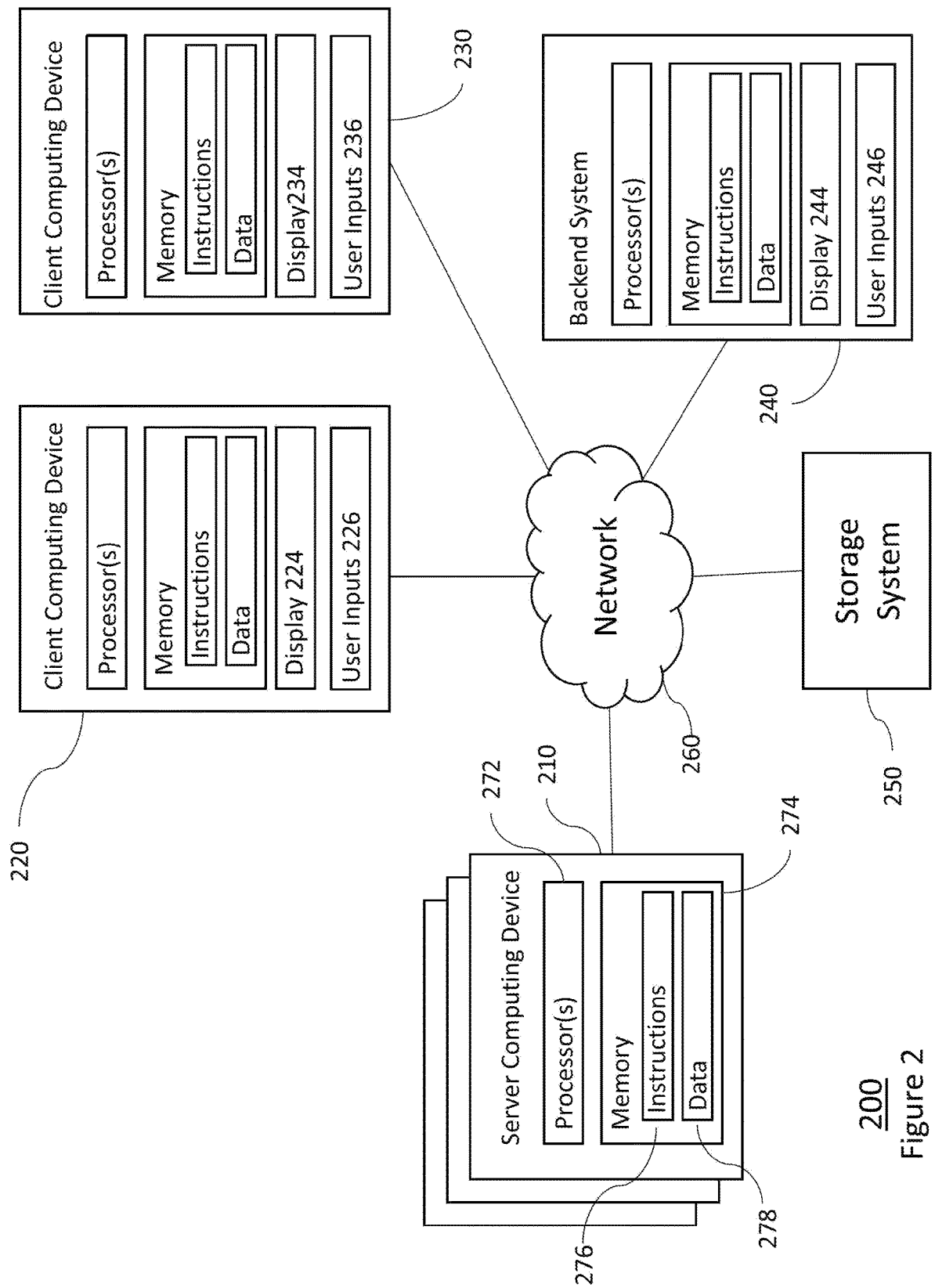
FIG. 2 illustrates an example system in accordance with aspects of the disclosure.

FIG. 2 is a network diagram of an example system 200 that includes a plurality of computing devices 210, 220, 230, 240 and a storage system 250 connected via a network 260. FIG. 2 shows as an example a communication network centric view of the system shown in FIG. 1.

As shown in FIG. 2, each of computing devices 210, 220, 230, 240 may include one or more processors, memory, data and instructions. For example, server computing device 210 includes one or more processors 272, memory 274, instructions 276 and data 278.

The memory 274 stores information accessible by the one or more processors 272, including instructions 276 and data 278 that may be executed or otherwise used by the processor(s) 272. The memory 274 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 276 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods and routines of the instructions are explained in more detail below.

The data 278 may be retrieved, stored or modified by processor 272 in accordance with the instructions 276. As an example, data 278 associated with memory 274 may comprise data used in supporting services for one or more client devices, e.g., 220, 230 or more. Such data may include data to support hosting web-based applications, file share services, communication services, gaming, sharing video or audio files, or any other network based services.

The one or more processors 272 may be any conventional processor, such as commercially available CPUs. Alternatively, the one or more processors may be a dedicated device such as an ASIC or other hardware-based processor. Although FIG. 2 functionally illustrates the processor, memory, and other elements of computing device 210 as being within the same block, it will be understood by those of ordinary skill in the art that the processor, computing device, or memory may actually include multiple processors, computing devices, or memories that may or may not be located or stored within the same physical housing. In one example, one or more computing devices 210 may include one or more server computing devices having a plurality of computing devices, e.g., a load balanced server farm, that exchange information with different nodes of a network for the purpose of receiving, processing and transmitting the data to and from other computing devices.

Computing device 210 may function as a server, including proxy server 120 of FIG. 1. Computing devices 210 also represent a cloud computing environment housing multiple computing devices that function as host devices.

The network 260, and intervening nodes, may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc. and various combinations of the foregoing. Such communication may be facilitated by any device capable of transmitting data to and from other computing devices, such as modems and wireless interfaces.

As shown in FIG. 2, each client computing device 220, 230 may be a personal computing device intended for use by a user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), speakers, and user input devices 226, 236, 246 (e.g., a mouse, keyboard, touchscreen or microphone). The client computing devices may also include a camera for recording video streams, speakers, a network interface device, and all of the components used for connecting these elements to one another.

Computing device 240 may also be a workstation associated with the network devices, e.g., one or more server computing devices 210, and used for administration and/or maintenance, including functioning as a backed system. In this regard, computing device 240 may be operated by a network administrator who supports, maintains and manages security associated with server computing devices 210. With regard to maintenance, the computing device 240 may enable the network administrator to access information about the servers such as the current version of software running on the server and installing updates, patches, etc. It may also function to access information about storage system 250, such as disk size, rewrite rate, etc. Again, although only a single backend system 240 is depicted in FIG. 2, the system may actually include many such workstations, or backend systems.

Although the client computing devices 220, 230 may each comprise a full-sized personal computing device, they may alternatively comprise mobile computing devices capable of wirelessly exchanging data with a server computing device (such as the server computing devices 210) over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, such as a smartwatch. As an example the user may input information using a small keyboard, a keypad, microphone, using visual signals with a camera, or a touch screen.

As with memory 274, storage system 250 can be of any type of computerized storage capable of storing information accessible by the server computing devices 210, such as a hard-drive, disk, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown, and/or may be directly connected to or incorporated into any of the computing devices 210, 220, 230, etc. Storage system 250 may store various types of information as described in more detail below. This information may be retrieved or otherwise accessed by one or more server computing devices, such as the devices 210, and/or one or more client computing devices, such as the client computing device 220, in order to perform some or all of the features described herein.

Figure 3:
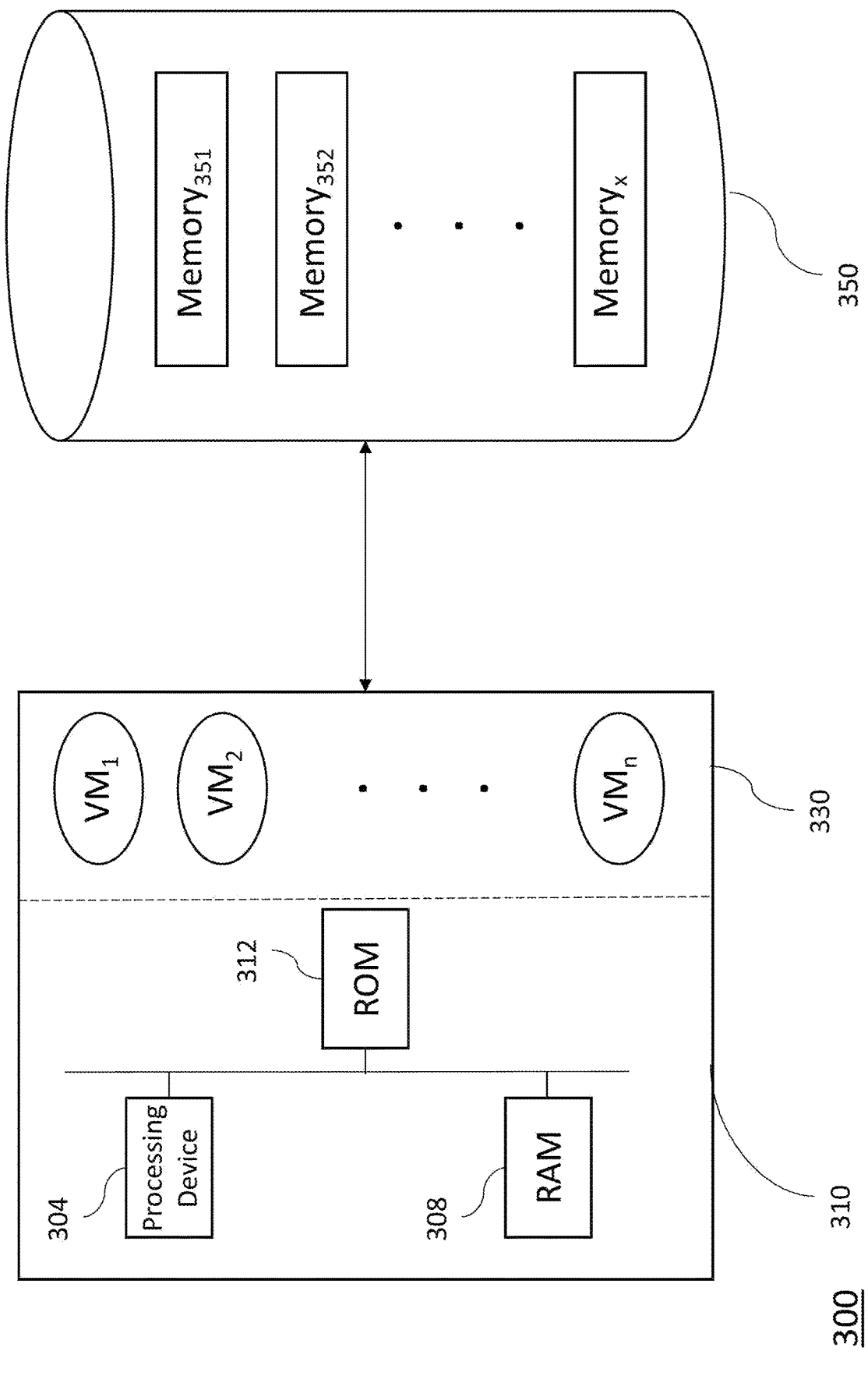
FIG. 3 is a functional diagram of an example system in accordance with aspects of the disclosure.

FIG. 3 is a functional block diagram of a system 300 in in accordance with aspects of the disclosure. The system 300 includes computing hardware 310 that is configurable to operate as one or more virtual machines (VM1 through VMn) 330 in communication with a disk 350. Note that a single disk 350 is shown in FIG. 3 to simplify the diagram. However, system 300 may include multiple disks 350. Computing hardware 310 includes processing device 304, volatile memory 308, and non-volatile memory 312 operable to run programming instructions storable in memories 308, 312. Computing hardware 310 may comprise a server or host computer. Disk 350 is a storage device that is partitionable to provide physical or virtual storage used by VMs 330 to provide computing services.

System 300 is an example of a virtual machine ("VM") implementable in cloud computing systems 150, 160, 170 and housed in a data center on computing hardware or host 310. Typically, a data center will include a large number of computing hardware 310 and disks 350 that may be configured to support an equally large or even larger number of virtual machines. As mentioned above, VMs comprise essentially a computer that doesn't run on its own dedicated hardware, but is rather hosted on some hardware that may be running multiple VMs. VM1 through VMn are shown in dotted outline to indicate they are virtual in nature on host 310.

Figure 4:
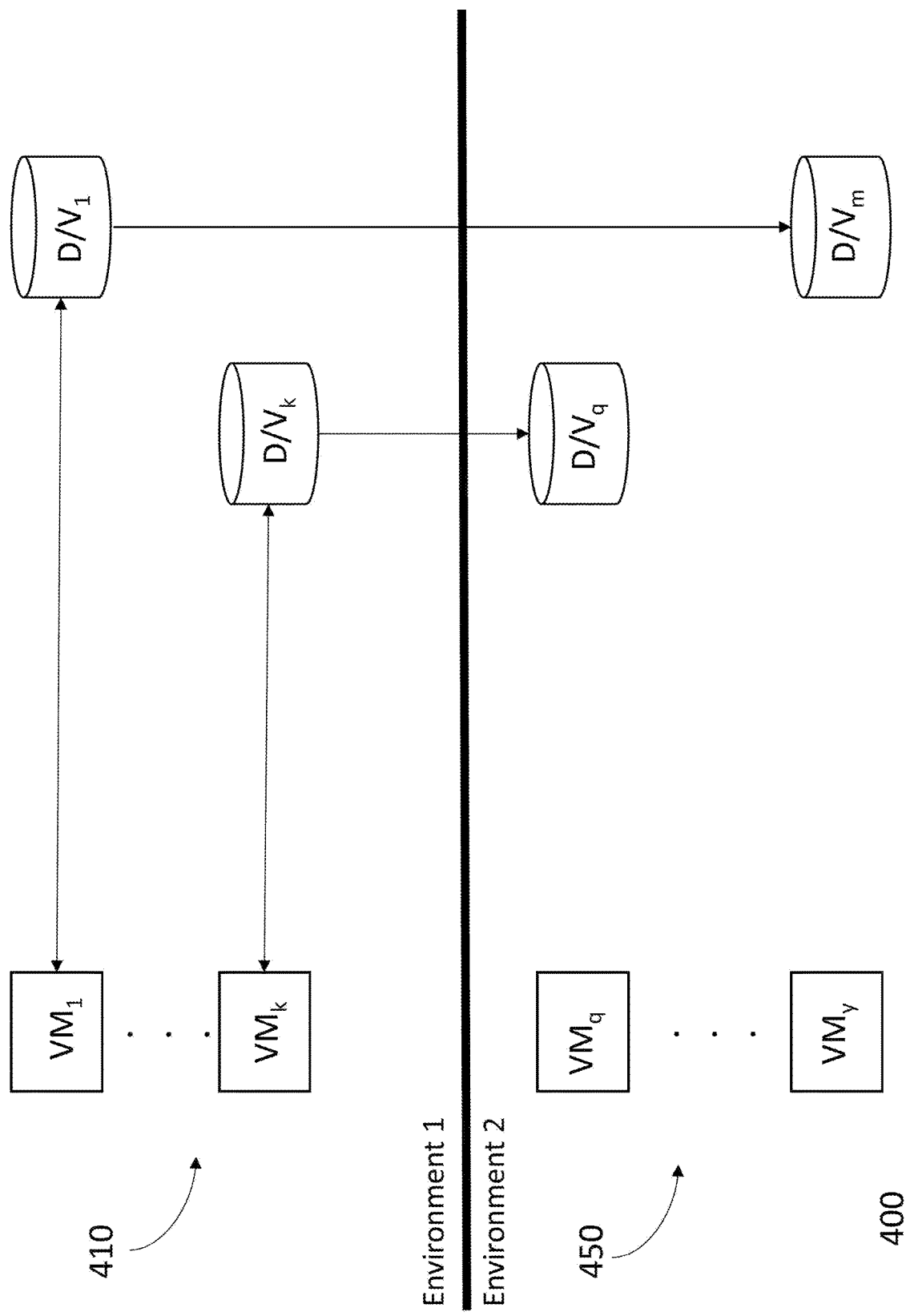
FIG. 4 is a functional block diagram of an example system in accordance with aspects of the disclosure.

FIG. 4 is a functional block diagram of example system 400 showing data flow in accordance with aspects of the disclosure. The system 400 includes a plurality of virtual machines, VM1 through VMk and VMq through VMy. Also shown are a plurality storage disks or volumes ("D/V"), D/V1 through D/Vk, and D/V100 through D/Vm. A disk/volume generally refers to a storage device/partition (either physical or virtual) attached to a VM. Disk/volume includes a persistent storage (i.e. non-volatile), but can also include cases where a storage device is volatile (e.g. RAM).

VM1 is associated with D/V1 and uses D/V1 to retrieve data for processing or store processed data. VM1 and D/V1 are in a first computing environment 410, as are other VMs and D/Vs, up through VMk and D/Vk. Though FIG. 4 (as well as other figures) implies a 1:1 relationship between VMs and D/Vs, this use case is shown in the drawings for the sake of simplifying the illustration. It is not untypical for multiple D/Vs to be associated with a given VM. First computing environment 410 may comprise a cloud computing system, e.g., any one of 150, 160, etc., data centers within a cloud computing system, or physical hardware within a data center, for example computing hardware 310, which might also be considered a data center.

FIG. 4 shows the act of migrating a VM or data associated with a VM from the first environment 410 (source) to a second environment 450 (destination). Migration may include moving/copying a VM from on-premise to a cloud, or from one cloud to the other. It may also include a move/copy operation between projects and/or regions, or even within a data center. Migration usually requires at least transferring the data that's on the VMs' disks from the source to the destination. Note that a single VM may have more than one disk (and usually at least one disk). On-premise refers to a VM running on hardware that is maintained by an entity, e.g., person or organization. In the example of FIG. 4, the second environment 450 may be a different cloud computing system, a different data center or different hardware within a data center than in the first environment 410. As shown data is copied from D/V1, for example, to D/Vm. The data copied or moved may comprise code or instructions used by a VM or data that such code or instructions operate on as input data or that are provided as output data by a VM.

Figure 5:
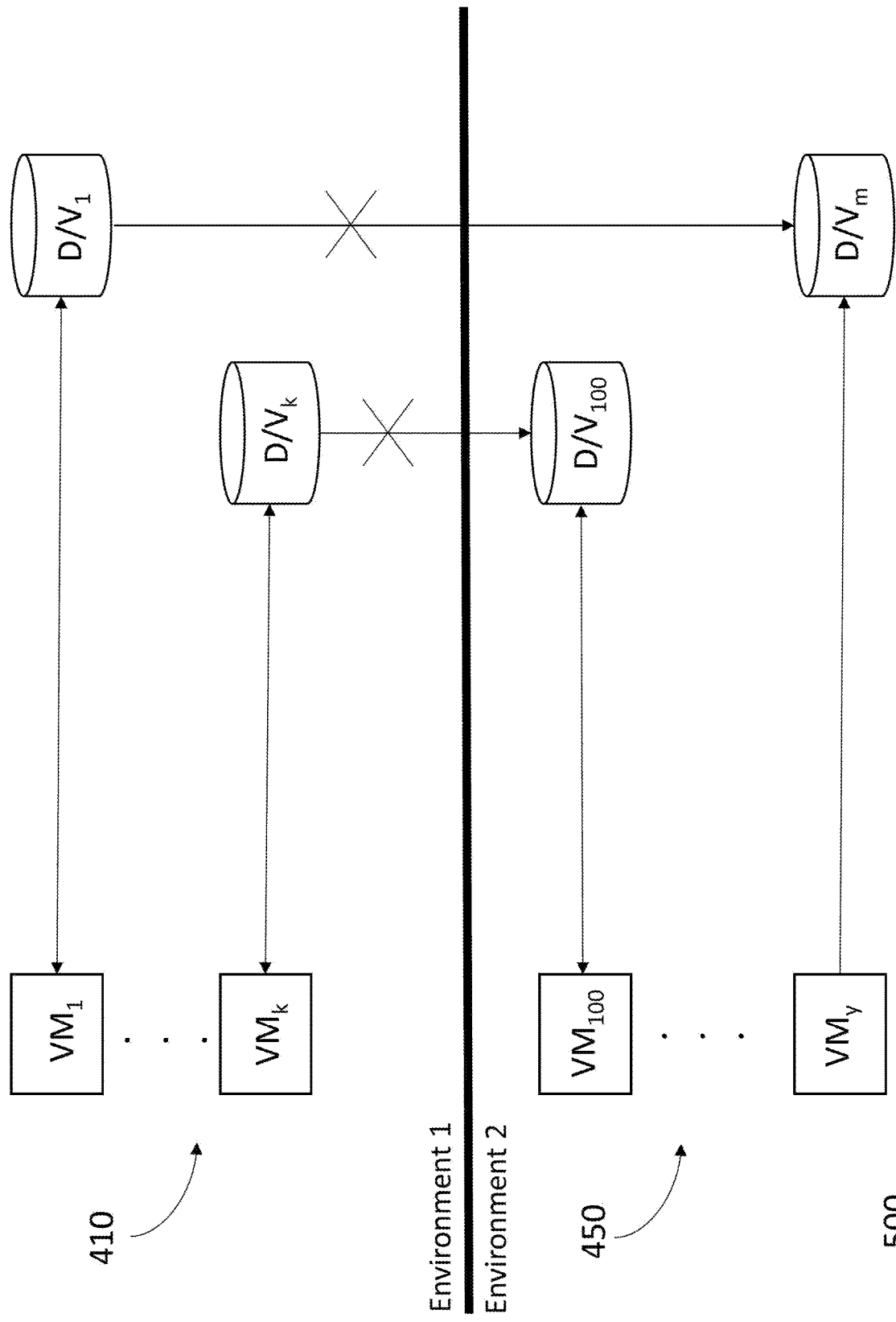
FIG. 5 is a functional block diagram of an example system in accordance with aspects of the disclosure.

FIG. 5 is a functional block diagram of the system in FIG. 4 after the migrated VMs have been cut-over to second environment 450. As shown, data residing on D/V1 has been copied and/or moved to D/Vm and data residing on D/Vk has been copied and/or moved to D/V100. In addition, VMs in the second environment 450 are now associated with D/V100 and D/Vm to perform tasks previously performed in first environment 410. Cut-over may be initiated while data is being copied or moved between different computing environments. A further option includes having the source VM running in parallel to the target VM—whether the target VM is a "test clone", or a production VM—in which case the cut-over operation signifies that the target VM is now the "main" VM, and not its respective source VM, thus creating a conceptual detachment between the two, and each one might now change its local data in a different manner. In addition, at some point in time such copying or movement will end migration of the current snapshot completing the migration process, though when cut-over begins another snapshot may be taken and transferred, potentially in parallel to the current snapshot being migrated, so that the destination has the most up-to-date state information. Also, cut-over potentially cancels a current snapshot migration and potentially initiates a different one instead.

Example Methods

Figure 6:
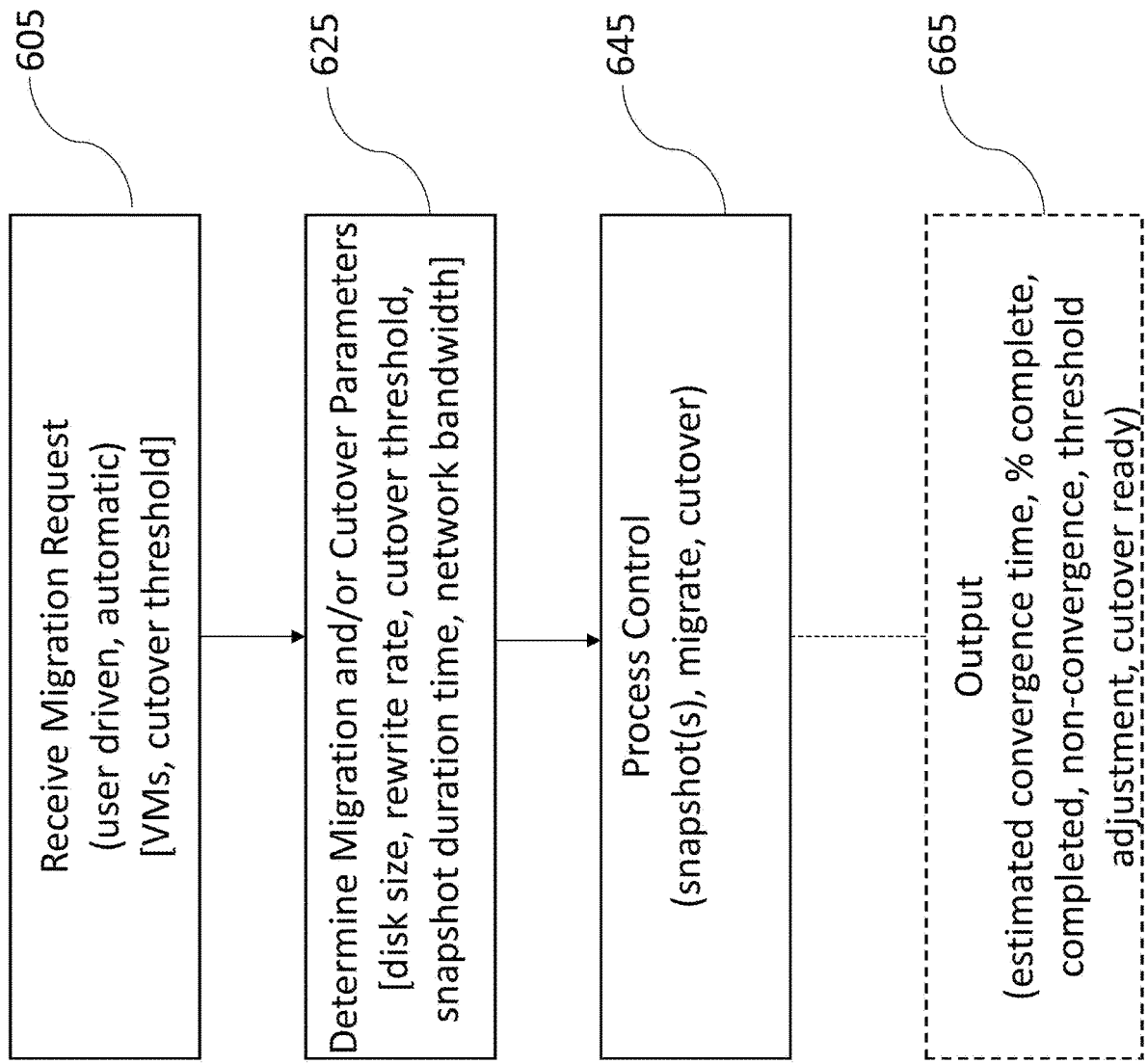
FIG. 6 is a flow diagram in accordance with aspects of the disclosure.

FIG. 6 is a process flow diagram 600 in accordance with aspects of the disclosure. As shown, the process essentially comprises three processing blocks or steps: receive migration request at block 605, determine migration and/or cut-over parameters at block 625 and process control at block 645. The process 600 may also include the step of outputting information to a user or to another system, as depicted in block 665. The process 600 may be implemented using backend system 130 or 240, or as a combination of cloud VM(s) "controller(s)" (which are a part of e.g. the destination's offerings) with a backend systems) running on the source side. The process 600 in part comprises a process that controls migration and cut-over and may do so dynamically and automatically as explained in further detail below.

At block 605, a migration request is received, for example, at systems 130 or 240. The migration request may comprise input generated via user node 106. The migration request may also be generated automatically. For example, backend system 130 may monitor performance of cloud computing resources on a cloud computing system or data center. Monitoring for example may include receiving information about the delay associated with processing a data stream or how long requests for computing resources from an end user are residing in queue, whether cloud computing environment bandwidth is within some threshold of capacity, disk size, disk rewrite rate, CPU usage, as well as other performance metrics associated with providing cloud computing services including collecting data from any involved computer.

The migration request may also identify one or more VMs that are to be migrated and a cut-over threshold. cut-over threshold comprises a threshold that determines when a cut-over operation can be performed. For example, this threshold can define how much of a given VM's state should remain to replicate at most before allowing the issuance of a cut-over operation. The more strict the threshold, the more VM snapshots that will be required and transferred from the source to the destination in order to be ready to perform the cut-over operation. VM snapshot refers to the complete state of a VM with all of its disks, from some point in the past, accessible for reading regardless of the current state of that VM. A VM snapshot may comprise one or more disk snapshots. A disk snapshot comprises the complete state of a disk, from some point in the past, accessible for reading regardless of the current state of that disk, and will be read by the migration process for the sake of transferring that state from the source to the destination over some network. All the disk snapshots that compose the VM snapshot are from a given point in time (and preferably the same point in time). Disk snapshots thus provide a complete coherent state of the VM.

For instance, with respect to cut-over threshold, assuming a VM has a single disk of size 100 GB which is rewritten at a rate of 1 GB per hour (i.e., a rewrite rate), and that migrating that VM will occur using a single 1 Gbps (i.e. ⅛ GBps) Ethernet line. The time it would take to migrate a first snapshot of that VM would be roughly 100 GB/(⅛ GBps)=800 seconds=~13.33 minutes=~0.22 hours. During that time, the disk at the source is being rewritten at a rate of 1 GB per hour, so by the time the first snapshot of that VM migrates, approximately 0.22 GB of that disk will have been rewritten (1 GB/hour*~0.22 hours), i.e., 0.22% of the disk (0.22 GB/100 GB). If the cut-over threshold is defined as 1% of the disk size then cut-over operation can occur once the first snapshot of that VM has migrated, since the work left (0.22%) is smaller than the threshold (1%).

In addition, the system may calculate a timing prior to that at which we can issue a cut-over operation which would shut down the source VM, take a final source snapshot, migrate that final source snapshot in parallel to the currently migrating [LAST−1] snapshot, while potentially for example utilizing under-utilized resources required for the migration, and have the entire process (both parallel snapshot migrations) end sooner than it would if we would have waited for cycle [LAST−1] to complete before issuing the cut-over operation. That said, calculated timing can take into consideration for example the cut-over threshold and the rewrite rate of course.

On the other hand, if the threshold is 0.1% of the disk size, another snapshot of that VM would need to be taken and transferred before being ready for cut-over operation. Note that transferring that second snapshot (i.e., the delta between that and the first snapshot) will take ~0.22 GB/(⅛ GBps)=1.78 seconds, and during that time 1.78 sec*1 GB/hour=0.5 MB of the source disk will be rewritten, and since 0.5 MB<<0.1%*100 GB=102.4 MB, a third snapshot of that VM would need not be taken in order to be ready for the cut-over operation.

In general, cut-over threshold is not necessarily based on percentages of the disk(s)/VM snapshot size. For instance, it can be a constant 1 GB. It can also be the result of any algorithmic computation, that can in turn be based on any data, such as but not limited to the sizes of the disk(s)/VM snapshots, the available network bandwidth, the rewrite rate of the different disks, the type of guest OS that's installed on the VMs, and other data that pertains to the VMs and/or the migration environment. The threshold is not necessarily based on the amount of data left to transfer, but may rather also be based on other factors that may be desirable to take into account as the deciding factors. Furthermore, the threshold may also be different for different VMs. Note that a different cut-over threshold can be defined per VM, or a single cut-over threshold can be defined for the entire system, or any other combination of these options can be collectively defined as the cut-over threshold in the discussions below. Another option for a cut-over threshold combination can be, for example, defining a common threshold for all VMs, and allocating (potentially different) budgets per VM, e.g., define the threshold as having at most 100 GB left to transfer during the cut-over operation, divided evenly between the VMs based on the total size of their disks.

Given the identity of the VMs and cut-over threshold, processing moves to block 625. At block 625, a determination is made of migration and/or cut-over parameters. These parameters may include (i) time(s) or timing to migrate computing resources on memory associated with one or more given virtual machines, (ii) time(s) or timing to instantiate cut-over of the one or more given virtual machines, (iii) time(s) or timing at which snapshots should be taken and/or executed.

Determining migration and/or cut-over parameters at block 625 can depend on, but not limited to, one or more of the following system parameters: disk size, rewrite rate, cut-over threshold, snapshot duration time and network bandwidth. In this regard, disk size/snapshot size may be considered to be the actual size of the data destined for transferal over the network for migration after taking into account multiple WAN optimizations that may be in place in order to reduce that size. Such optimizations may include but are not limited to compactly treating zeroed ranges, compressing the data, utilizing data-deduplication mechanisms etc.

Typically, migration will be a mass migration event, i.e., the act of migrating multiple VMs in parallel. In that context, a migration wave is considered mass migration of a well-defined set of VMs, which may be only a subset of the total amount of VMs the user may want migrated (across different migration waves). Further, replication-based migration may be considered the act of migrating a VM by periodically taking snapshots of that VM in the source (potentially while it's still running in the source), replicating (copying) these snapshots (or the deltas between them) to the destination, and eventually performing a "cut-over" operation in which the source VM is shut down, a last snapshot of it is taken and transferred to the destination, and then the destination VM can be started in the destination with the latest state it had in the source. Typically, it will be started in the destination if requested by the user.

Determining migration time or timing may comprise determining a start time for migration for a given VM. For example, in case a user has two VMs—VM1 and VM2, and VM1 has a single disk of 1 TB, while VM2 has a single disk of only 1 GB, and the user wants both VMs to start at the destination at about the same time. If both VMs are running in the source during the migration, which is typically the case, then snapshots would be periodically taken of both VMs and replicated to the destination. If the VMs are running in the source, they may be changing the content of their disks. Because source VMs keep running and changing their data, further snapshots need to be taken and migrated in order to reduce the cut-over downtime as much as possible. Generally, the state at the destination needs to be kept as close to the state at the source as possible. Otherwise, the cut-over action will take longer than needed, and likely lead to more downtime.

Furthermore, if both VMs are allotted similar network bandwidth for their respective migrations, the migration of the first snapshot of VM1 will take about (1 TB/1 GB=) 1024 times the time it will take to migrate the first snapshot of VM2. If while the first snapshot of VM2 is migrating, the entire contents of VM2's disk is re-written, this would result in that while the first snapshot of VM1 is still migrating, a second snapshot of VM2 would need to be created and migrated. This would add an additional 1 GB of data that needs to be transferred over the network from the source to the destination. This may be repeated, e.g., an additional 1022 times, while the first snapshot of VM1 is being migrated.

If, however, a better timing was chosen to start the migration of VM2, migration of redundant data may be avoided. For example, the first snapshot of VM2 may be obtained and migrated only when there is approximately 1-2 GB of data left to transfer out of the 1 TB of the first snapshot of VM1. Another option would be to take into account the network speed available (to perhaps allocate different portions of it to different VM snapshot migrations), the time it takes to take a snapshot (perhaps considering the size of the disk/the prospected snapshot size in case Changed Blocks Table (CBT) or Dirty Blocks Table (DBT) functionality is available), the disk rewrite rate of the different VMs that are being migrated together etc. These examples provide some migration factors that may be taken into account in determining a migration parameter. In general, migration factors or metrics are computing and/or network parameters that may impact the migration process, including migration timing.

By taking these factors into account to improve the timing of when to start taking snapshots and migrating each VM of a mass migration wave, the total amount of data that needs to transfer from the source to the destination can be reduced (since less snapshots are taken, and, e.g., disk rewrite rates are taken into account). This in turn, may shorten the time it takes to be ready for the cut-over operation.

At block 645, the parameters determined in block 625 are used to control VM migration and eventual cut-over. Such control may be impacted by backend system 130, 240, which may be coupled to other systems within computing clouds 150, 160, 170 or data centers that control initiating snapshot requests, migration requests or cut-over requests, or monitor rewrite rates, disk size, data transfer rate or other measurements. More generally, since backend system 130, 240 can also monitor such information or receive measurement data that impact migration rate and work left, it may dynamically control the process and provide feedback to the end user. For example, if it appears that the process is not converging, backend system may determine a cut-over threshold as part of block 645 that will bring about convergence.

More specifically, since the migration system monitors different measurements that impact the migration rate and the work left, it may also identify a non-converging process. For example, if the backend system identifies that the total source rewrite rate is fast enough such that the effective rewrite rate (considering for example data compression before sending over a WAN) is faster than the available network bandwidth between the source and the destination, it may alert or notify the user that at some point a cut-over operation will need to be initiated despite the fact that a cut-over operation would require migrating a considerable amount of data during the downtime (and how long that would probably take).

Besides a notification, in this case, a resolution may be to adjust the cut-over threshold such that it requires for example at least one target snapshot to exist per VM in the migration wave. Another example may be that the defined cut-over threshold is so strict (e.g. 1% of the size of the disks of each VM) such that even after taking and migrating three snapshots of some source VM, a delta of 5% remains between the latest state of the source and the last source snapshot, and even taking and migrating a fourth snapshot would still yield a 5% delta; or even worse, the delta grows from snapshot to snapshot. In such a case, the user can be notified or alerted about a non-converging process, suggest adjusting the cut-over threshold accordingly, and even suggest a specific threshold that can be passed considering the live dynamic data being collected—but strict enough to keep the cut-over operation time low (under the constraints at hand).

As part of block 645, backend systems 130, 240 may also provide a time estimate of when the cut-over threshold will be reached or passed ("ETC") to the user. The estimation may be made by considering, for example, the amount of data left to transfer, how many snapshots will likely be needed for each VM (also considering for example the rewrite rate of that VM), the network bandwidth that's available for the migration and the cut-over threshold. This prediction may be updated based on live dynamic changes in network throughput, variable rewrite rates, undetermined migration start timings etc.

Alternatively, a user may define their own set of constraints and the system provides feedback on how it impacts the estimated time for passing the cut-over threshold, i.e., the ETC. For instance, the user may choose to limit the network bandwidth that's available for migration to some maximum value, thus directly increasing the time it would take to pass the cut-over threshold (compared to the case where there's no limit on the network bandwidth).

As part of block 645, backend systems 130, 240 may also be configured to automatically initiate cut-over operation. For example, the system can be configured to allow a user to select automatic cut-over operation once the cut-over threshold is crossed. Furthermore, a user may define a set of constraints that when reached causes a cut-over operation to be automatically launched or initiated. For example, the user may define a limit for network bandwidth to some maximum value, that the cut-over threshold to be defined as having at least one snapshot migrated per VM, and that cut-over downtime to not exceed 3 hours. These combined constraints may accordingly define a new threshold (from here on: an "automatic cut-over threshold"), potentially independent of the cut-over threshold, and when this new automatic cut-over threshold is passed, an automatic cut-over operation is issued.

This option may be useful when, for example, there's a high variance in the rewrite rate in different hours of the day, which might cause cases where the cut-over threshold is passed, but then an hour later the cut-over threshold criteria is no longer met, e.g., having a 1-hour window in which the cut-over operation (based on potentially given constraints) could have been issued, but now that the rewrite rate has become much higher—the ETA for passing the cut-over threshold is >0, and/or the ETA for the cut-over downtime is too high relative to some constraint defined in the system. That 1-hour window might have been during a time where the user was not monitoring the system, and the user would have liked the cut-over operation to be issued at that time—considering that all constraints were met.

When cut-over operation is initiated, the source VMs for a migration wave are gracefully shut down, and a final snapshot of the VMs are taken and migrated to the destination. The VMs may then be started in the destination if required. The time it takes to perform this operation directly depends on the computing and/or network environment (e.g., max read rate from the source, max network speed, etc.). In addition, it depends on the delta between the final source snapshot and the one preceding it (if any one exists). The larger this delta the more data that needs to be transferred during the cut-over operation, and thus the more downtime the user will experience as a result. This down time may be brought to a minimum by keeping the destination state as close to the source state as possible, while also taking into account the user's preferences and requirements in regards to the repercussions of the functionality of keeping the destination state as close to the source state as possible after passing the cut-over threshold—such as the derived costs of this functionality, its network utilization, etc.

As part of block 645, once a migration wave is ready for cut-over from a source, VM source snapshots may continue to be taken and migrated to the destination so that the destination state may be as close to the source state as possible, until the cut-over operation is initiated, and thus keep the cut-over time as short as possible. Alternatively, in place of taking snapshots between the events of meeting cut-over threshold criteria and initiating cut-over operation, the system may be configured to wait for the initiation of cut-over operation and only then take a final snapshot. This would reduce the amount of data transferred from the source to the destination, which may be desirable to some users, and reduce the possibly redundant work of taking and migrating snapshots, which may be undesirable to some users. Any option in between is also possible, e.g., continue taking an additional snapshot of every VM every 24 hours until the cut-over operation is initiated, or perform an exponential backoff mechanism such as for example taking an extra snapshot after 1 hour, 2 hours, 4 hours, 8 hours etc., potentially up to a limit of e.g. 72 hours. Another approach, for example, may be taking an additional snapshot if there's at least X amount of data to be migrated for a VM if we were to take a source snapshot of that VM at that moment in time.

In another aspect, the data blocks being rewritten at the source ("working set") may be taken into account. In some instances, this may be more important than the rewrite rate itself when deciding whether it's worth taking and migrating another snapshot for a given VM before issuing the cut-over operation. For example, use may be made of CBTs/DBTs. CBTs/DBTs represent data blocks that were changed between two given snapshots (either disk snapshots or VM snapshots). This may be useful when wanting to transfer only the delta between two snapshots from a source to a destination, in order to reduce the amount of traffic required for it, without having to calculate that delta on demand (but rather usually on-the-fly by the provider of that functionality) or let alone having to transfer the entire updated snapshot. A CBT may contain, per block, its offset, its size (if it's not constant across all blocks in the CBT), and its data (though it's usually read separately, to keep the CBT small, and as metadata only).

If CBTs between the snapshots of each VM are being tracked, the deltas and the variance between them may be examined and a matching variance score may be allocated based on how different are the offsets and sizes of the blocks between, for example, the CBT between snapshots 1 and 2 and the CBT between snapshots 2 and 3. The lower the variance, the less efficient it would be to take more and more snapshots before the cut-over operation is issued. For instance, if there's no variance at all in the foregoing example, once the cut-over operation is issued such a CBT will have to be transferred, therefore migrating another similar snapshot before the cut-over operation is issued may not make sense. Note that the deltas between snapshots 1-2 and 2-3 contain the same block offsets, but these blocks have different data in them. Thus, taking and migrating another snapshot of different VMs may be prioritized over issuing the cut-over operation based on, among other things, the variance of their CBTs.

As part of block 645, an estimate for how long it may take for the cut-over operation to be completed, i.e., cut-over down time ("ECODT"), may also be generated. This may be generated by considering, for example, (1) work left to be done (initially—the aggregated size of the delta between the final source snapshot and its previous source snapshot), (2) the compressibility rate of the source data, (3) the CBT variance of each VM (as discussed above), and (4) available bandwidth. ECODT may also be provided after cut-over has been initiated. The user may also be provided with the option of setting constraints and showing the user how such constraints impact ECODT. For instance, the user may like to limit the network bandwidth that's available for the migration to some maximum value, thus directly increasing the cut-over downtime (compared to the case where there's no limit on the network bandwidth).

Example Use Cases

Figure 7:
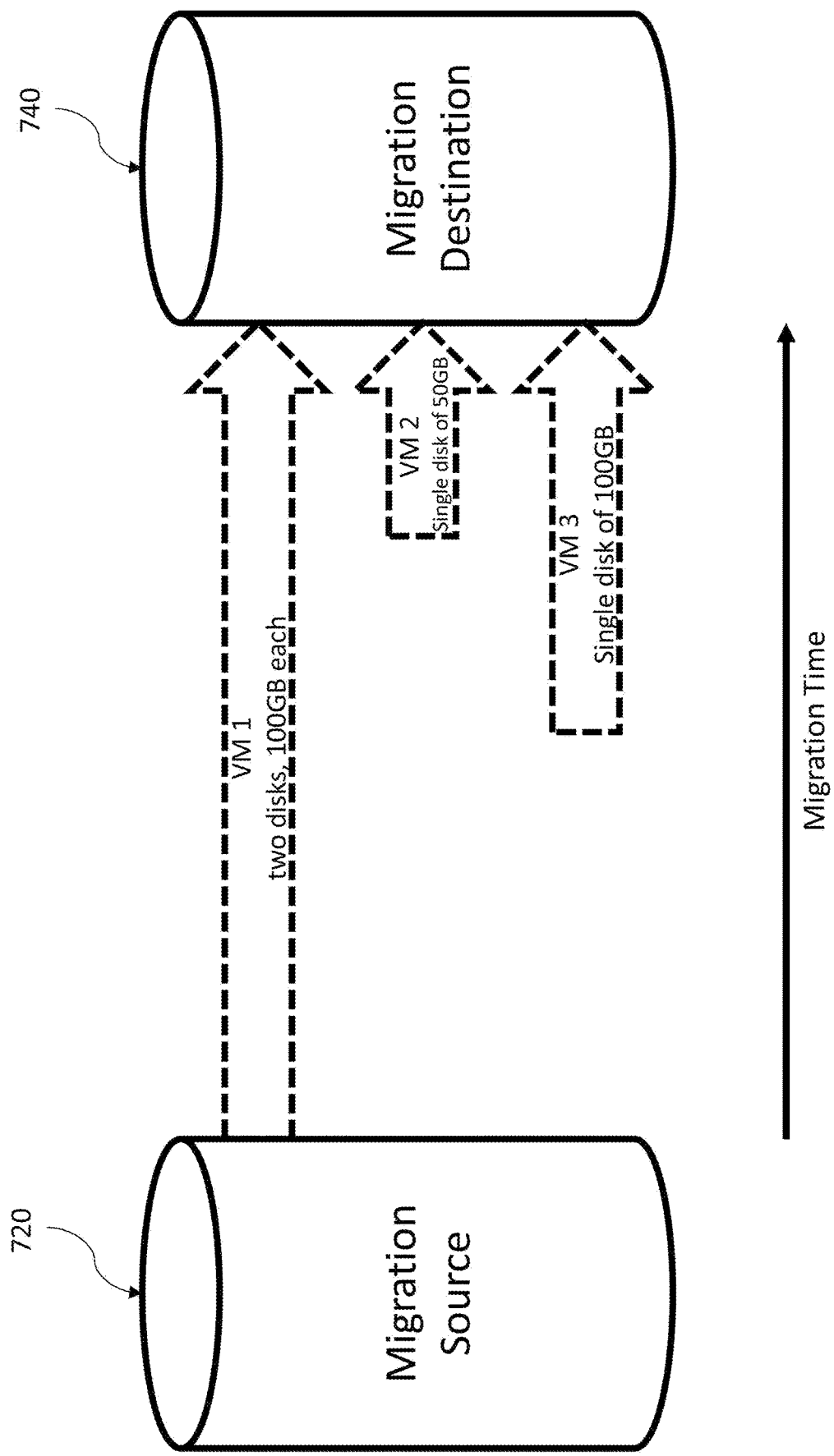
FIG. 7 is a functional block diagram illustrating an example use case of the method or system in accordance with aspects of the disclosure.

FIG. 7 illustrates a use case 700 in accordance with an aspect of the disclosure. In use case 700, VM migration times are chosen based on disk sizes.

In FIG. 7 a migration wave is shown having 3 VMs, where the first VM (VM1) has two disks each 100 GB, the second VM (VM2) has a single disk of 50 GB, and the third VM (VM3) has a single disk of 100 GB. In this example, the first snapshot is initiated and migration of each of the three VMs is started based on their initial VM snapshot size. The largest VM, VM1, which has a total VM snapshot size of 200 GB, is started first. When there is only 100 GB of data left to transfer out of this first snapshot of VM1, a first snapshot of VM3 is initiated. And since its initial snapshot size is 100 GB, migration of VM3 has also started at that time. At that point, in this example, VM1 and VM3 were being allocated the same proportion of network bandwidth to utilize for their respective data transfers from the source 720 to the destination 740 of the migration.

When only roughly 50 GB is left to transfer out of the first snapshot of VM1 and roughly the same from the first snapshot of VM3, the first snapshot of VM2 is initiated, since its initial snapshot size is 50 GB. Accordingly, all 3 VMs can be migrated in parallel—giving each one of them an equal portion of the network bandwidth that is available for the sake of the migration. This way, migration of each VM is initiated in a timely manner. As such, all three VMs will complete the transfer of their respective initial VM snapshot roughly around the same time, without incurring any additional cost, e.g., redundant migration time of taking multiple snapshots of some VM while the other VMs haven't even finished migrating their initial snapshot.

Note the system could have taken into account whether parts of the different VMs's disks contain no data or was zeroed, optimize the migration such that no transfer zeroed data occurred, and thus only take into account the non-zeroed data when deciding on the migration start time of each VM in this migration wave.

Also note that this drawing is not to scale in terms of how long it takes to transfer data. For example, at the first stage only the migration of VM1 was utilizing the network, i.e., 100% of the network bandwidth or speed available, while in stage two there were two VMs sharing that network, each getting half the speed now—when compared to the first stage. Similarly in stage 3 each VM migration was getting only a third of the speed compared to the first stage. Thus, though not shown in the third stage it takes 3 times as much time to transfer 3 times the amount of data when compared to the transfer rate illustratively depicted in the first stage.

Figure 8:
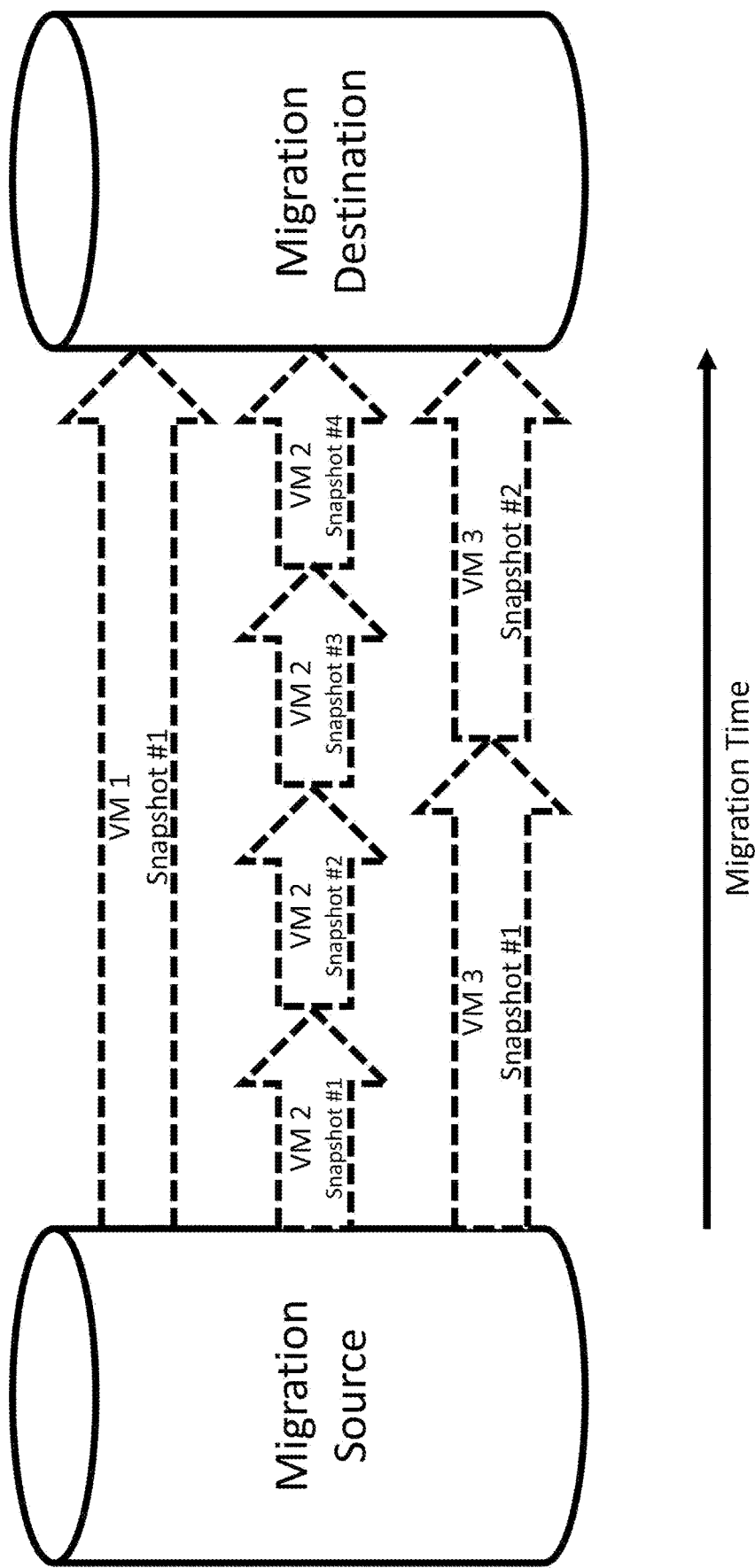
FIG. 8 is a functional block diagram illustrating an example use case of the method or system in accordance with aspects of the disclosure.

FIG. 8 illustrates a use case 800 in accordance with an aspect of the disclosure. In use case 800, VM1, VM2 and VM3 begin migration at the same time.

In this example, for simplicity and clarity of the examples, let's assume that by the time transferal of a snapshot of a VM (any snapshot of any VM) is completed, the entire content of all of that VMs' disks has been rewritten, such that taking another VM snapshot at that point will create a snapshot that's completely different from its previous one. To keep the destination up-to-date with the state at the source, it would be necessary to transfer an additional amount of data that roughly equals the sum of the sizes of that VM's disks.

With this in mind, where migrating all 3 VMs is started at the same time, there is more data to transfer until we reach the point where all 3 VMs have at least one snapshot in the destination. This happened since, for example, while the first snapshot of VM1 was being transferred, transferal of the first snapshot of VM2 was completed, a second snapshot of VM2 was taken, the second snapshot had to be transferred, and so on and so forth, up to a total of 4 snapshots of VM2. This means that at least for VM2 we had to transfer 4 times the data we could have transferred if we were to initiate the migration of that VM at a better timing.

Note that FIG. 8 is similar to FIG. 7 in regards to the illustrated timeline. These two figures, however, represent different amounts of time since in FIG. 8 more data has to be transferred over the same network. Thus, FIG. 8 takes more time compared to FIG. 7.

Figure 9:
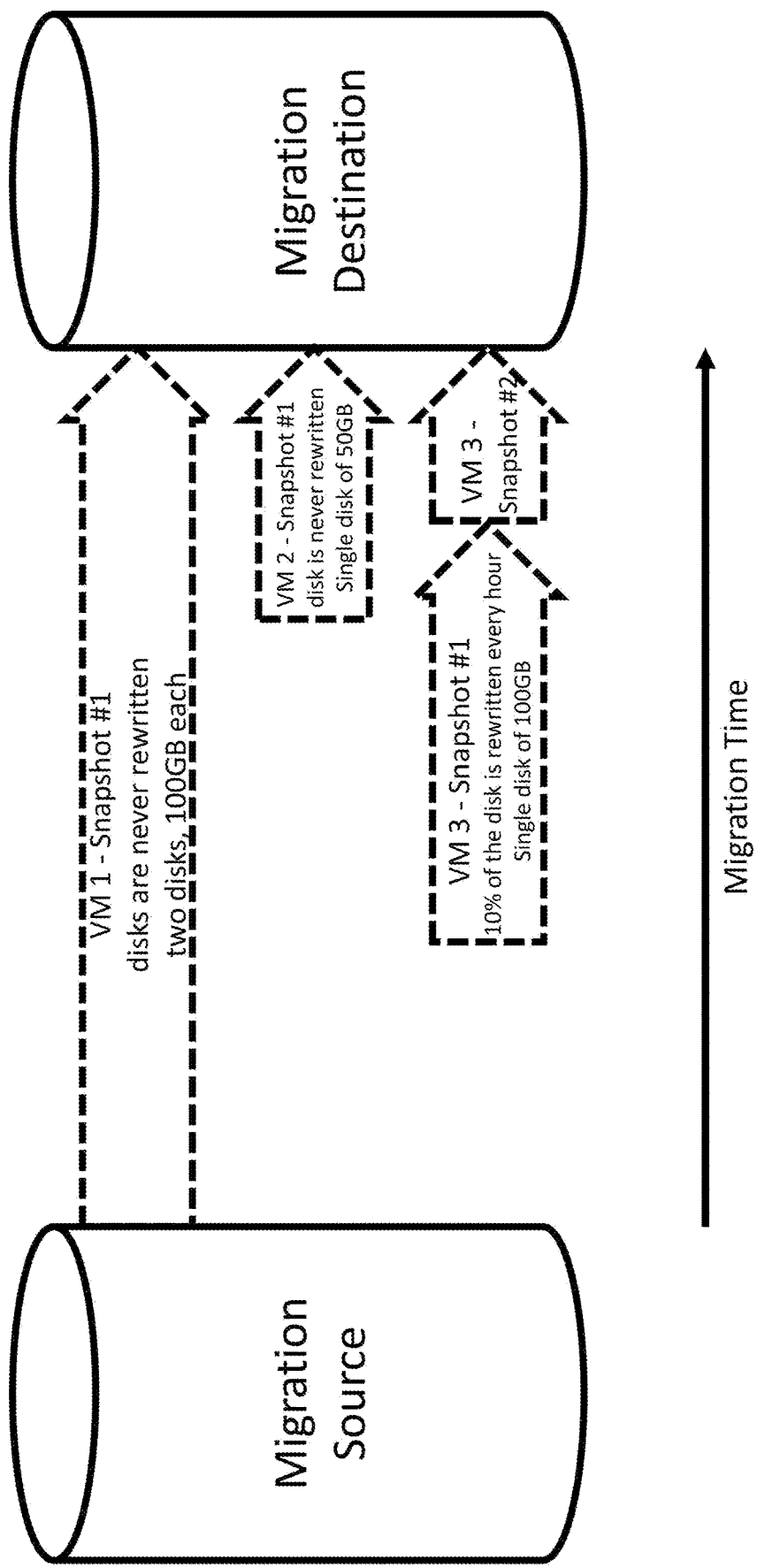
FIG. 9 is a functional block diagram illustrating an example use case of the method or system in accordance with aspects of the disclosure.

FIG. 9 illustrates a use case 900 in accordance with an aspect of the disclosure. In use case 900, disk rewrite rate is considered in VM migration start timing Specifically, the start time for migrating each of the 3 VMs that need to be migrated in the same migration wave is based on the sizes of their disks, a cut-over threshold that's based on the sizes of the disks, the disk rewrite rate of each VM, and the network bandwidth available for the migration.

In this example, the cut-over threshold is 0.5% of the total size of the disks of each VM (threshold per VM), the network bandwidth is assumed to provide a steady 1 Gbps (i.e. ⅛ GBps) connection between the source and the destination, and every VM migration is allocated a similar portion of the available network bandwidth when being migrated. This means that when migrating 3 VMs in parallel, each VM gets a network speed of 42.67 MBps (=1 Gbps/3) Similarly, for two VMs in parallel each gets 64 MBps, and a single VM will get 128 MBps.

In this example, the disks of VM1 and VM2 will not get rewritten, therefore with appropriate time, —we only take a single snapshot for each one of them. Since VM2 is the smallest one of the three and it's never rewritten—its migration should be timed such that it will be the last one to join. This means that the entire single snapshot of VM 2 will be migrated at a speed of 42.67 MBps, which would take (50 GB*1024 MB/GB)/42.67 MBps=1,200 seconds=20 minutes=⅓ hour.

Note too that the migration of VM3 would require migrating at least its first snapshot (100 GB), at a speed which is between [42.67, 64, 128] MBps—which would take [⅔, 4/9, 2/9] hours respectively. During that time, the amount of data that will be rewritten at the source disk of that VM is [6.66, 4.44, 2.22] GB respectively (10%*100 GB=10 GB every hour), which is respectively [6.66, 4.44, 2.22] % of the VM snapshot size. Compared to a cut-over threshold of 0.5%, it means that at least another snapshot of VM3 will be required to pass the cut-over threshold. That delta between the second and first snapshots of VM3, in turn, would take at most 160 seconds to transfer (=6.66 GB/42.67 MBps). During that time at most 0.44 GB of the source disk of VM 3 will be rewritten (=10 GB per hour*160 seconds), which is less than 0.5% of that disk (0.44 GB/100 GB=0.44%). This means that a third snapshot of VM 3 need not be taken before passing the cut-over threshold for that VM. This means that the total amount of data to transfer in order to pass the cut-over threshold for VM3 is between 102.22 GB and 106.66 GB. Accordingly, the migration of VM 3 should be started before the migration of VM2, since the total amount of data that we need to transfer for passing the cut-over threshold for VM 2 is 50 GB of its first snapshot. Similarly, the migration of VM 1 will start first, since transferring 200 GB of the first snapshot of VM1 will be called for in order to pass its cut-over threshold.

Overall, with this approach at most (200+106.66+50=) 356.66 GB of data needs to be transferred to be ready for the cut-over operation of the entire migration wave.

Figure 10:
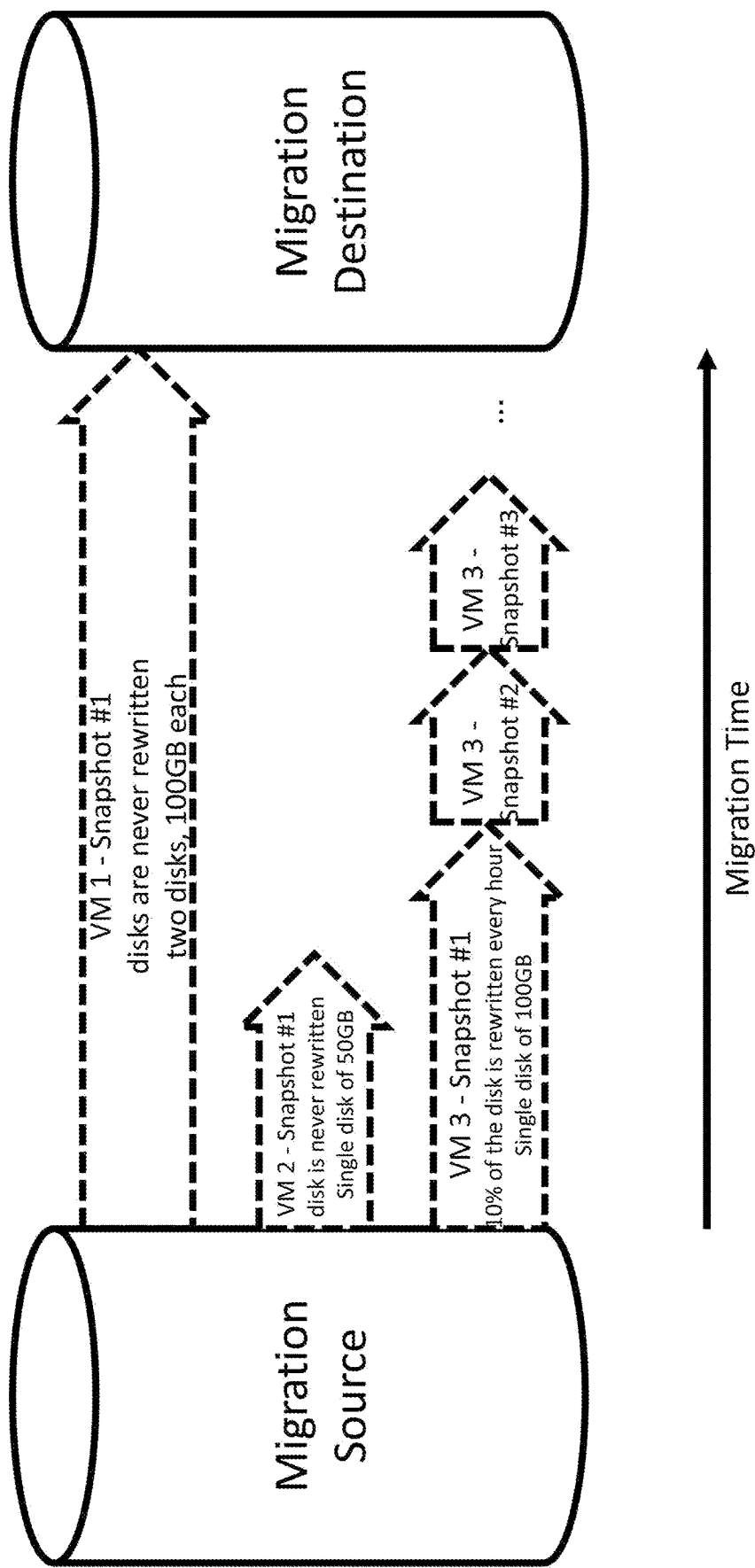
FIG. 10 is a functional block diagram illustrating an example use case of the method or system in accordance with aspects of the disclosure.

For comparison, migration of all 3 VMs is started at the same time in FIG. 10. Specifically, FIG. 10 illustrates a use case 1000 where only the first snapshot of VM1, which is 200 GB, has to be migrated since it's the largest snapshot of all 3 VMs and it's never rewritten. Only the first snapshot of VM 2, which is 50 GB, will need to be migrated since it's never rewritten. Once migration of the first snapshot of VM2 is completed, and then the remainder of the first snapshot of VM3, further snapshots of VM3 need to be taken and transferred from the source to the destination, as the disk of VM3 is being rewritten at a rate of 10 GB per hour. Thus, more and more VM3 data is being transferred while still migrating the first snapshot of VM1. The bigger the VM1 disks are compared to VM3, and/or the higher the rewrite rate of the disk of VM3 is, the more data that needs to be transferred from the source to the destination, and thus the more time it would take to pass the cut-over threshold for all VMs—compared to FIG. 9.

Figure 11:
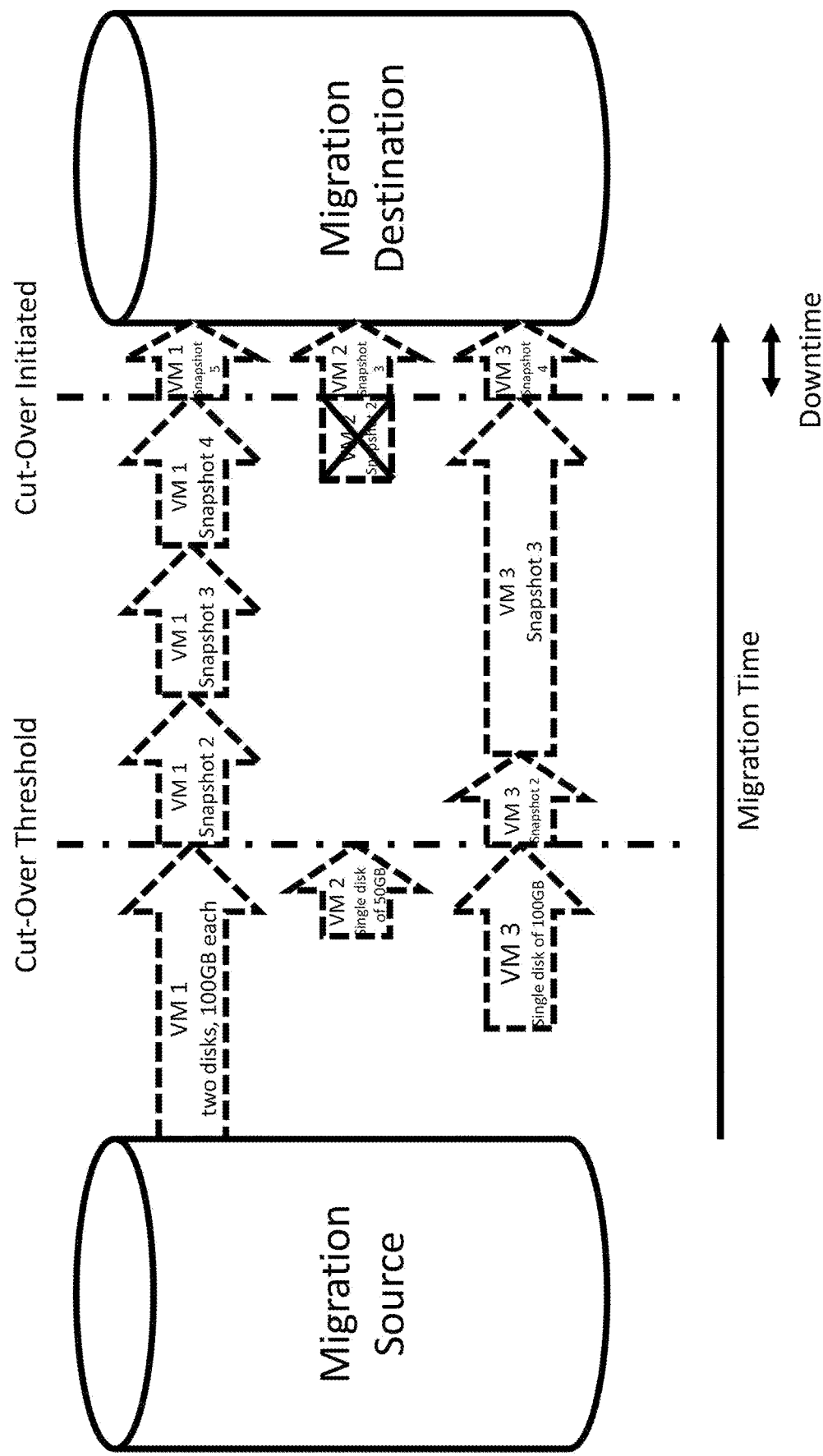
FIG. 11 is a functional block diagram illustrating an example use case of the method or system in accordance with aspects of the disclosure.

FIG. 11 illustrates a use case 1100 in accordance with an aspect of the disclosure. FIG. 11 illustrates keeping up-to-date with the source after passing the cut-over threshold and performing a cut-over operation. Use case 1200 illustrates a full migration cycle of a migration wave of 3 VMs, where the cut-over threshold is defined as having at least one target snapshot per VM in the migration wave.

When migration is initiated—as described in FIG. 7—a migration start time is selected for each VM in order to reduce the overall amount of data to transfer from the source to the destination in order to pass the cut-over threshold, while aiming at having all 3 initial snapshot migrations to end around the same time. The estimated time for passing the cut-over threshold in this case can be calculated dynamically by dividing the total size of the disks by the effective network upload rate from the source to the destination (while also considering compression and other WAN optimization methods that may apply).

In this example, after passing the cut-over threshold, more and more snapshots are periodically (e.g., continuously) and consecutively taken and migrated in order to keep the destination state as close to the source state as possible, doing so as quickly as possible, and in a fair manner Treating the different VMs in some fair manner can be based on, for example, dividing the network speed by the amount of VMs, and/or taking into account the size of their disks and rewrite rates. In the illustrated example, VM1 had 3 snapshots taken for it [Snapshot 2,3,4] after passing the cut-over threshold and before initiating the cut-over operation. The 3 snapshots are similar to each other in size, as the rewrite rate in this case is constant for that VM. On the other hand, during this time, for VM3 a first initial relatively small snapshot (Snapshot 2) was taken since there were little changes to apply, but then immediately afterwards another snapshot was taken. This snapshot is relatively big—as a big portion of VM3's disk has been rewritten while we were working on VM3 Snapshot 2. Furthermore, for VM2 no snapshots were taken during that time because there are no changes to apply (the disk is not being rewritten at all). Then, at some point, during a routine check for changes, changes are detected and taken care of by taking and migrating VM2 Snapshot 2. In the middle of this operation, the user initiates cut-over operation, which in turn aborts the handling of VM 2 Snapshot 2, and starts a different snapshot—VM2 Snapshot 3, instead. Alternatively if a check was made at the point in time of initiating the cut-over operation, it would be faster to finish tending to VM2 Snapshot 2 and only then take VM2 Snapshot 3, that could be done (as it may have been faster than aborting all the work done so far with Snapshot 2 and then redoing it as part of Snapshot 3).

When the cut-over operation is initiated, the downtime period starts. Source VMs are turned off, a final snapshot of each VM is taken and migrated (namely: VM 1 Snapshot 5, VM2 Snapshot 3, and VM3 Snapshot 4), and the 3 VMs are turned on or instantiated in the destination—which ends the downtime period.

Notice that the flow illustrated here demonstrates that the downtime was as short as possible, as we kept utilizing available resources (e.g. network bandwidth) in order to keep the destination state as close to the source state as possible at any given moment, such that whenever the user chooses to initiate the cut-over operation, the system is prepared for it, providing the shortest downtime possible.

Figure 12:
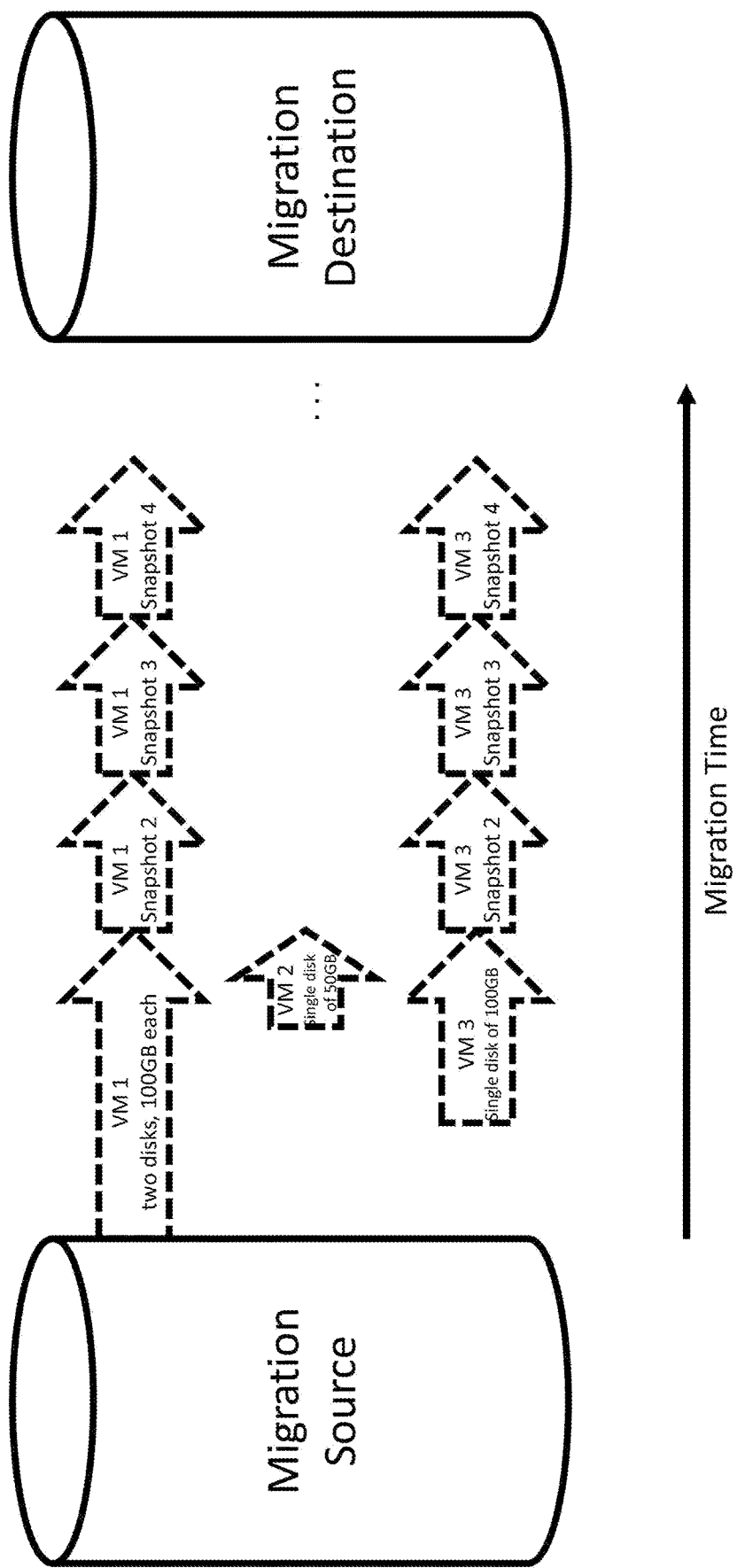
FIG. 12 is a functional block diagram illustrating an example use case of the method or system in accordance with aspects of the disclosure.

FIG. 12 illustrates a use case 1200 in accordance with an aspect of the disclosure. Specifically, this figure illustrates a non-converging process and cut-over threshold adjustment.

In this example, the cut-over threshold is initially defined as having a cut-over downtime of up to 10 minutes. Migration start of each of the 3 VMs is timed such that the initial snapshots will finish migrating around the same time. When migration of the initial snapshots is completed, a check is made to determine if there has been a change in the disks of the 3 VMs—which would require taking at least one more snapshot in order to have the destination state fully synchronized with the source state. The system determines that the disk of VM2 hasn't changed at all, while the disks of VM 1 and VM3 have changes of 50 GB each when comparing the current state with the state of the initial snapshot. Given a 1 Gbps network upload bandwidth from the source to the destination, it would take (50 GB*2/1 Gbps=) 13.33 minutes for migration, which is larger than the threshold of 10 minutes. This means the cut-over threshold has not been passed yet, and so a second snapshot is taken for both VM1 and VM3, to continue keeping the destination state as close to the source state as possible and as fast as possible.

When the second snapshots are taken and migrated, the system checks and detects that VM1 and VM3 now have changes (e.g. a delta between the current state and the state of their respective second snapshots) of 100 GB each. This means that if a cut-over operation were to be initiated at this time—the downtime would have been (100 GB*2/1 Gbps=) 26.67 minutes—which is even larger than before.

At this point, since we noticed the process will probably not converge, the system alerts the user about a non-converging process, and automatically adjusts the cut-over threshold to, for example, 30 minutes.

The system continues to take consecutive snapshots and migrate them in order to keep the destination state as close to the source state as possible.

If it's determined that as snapshots continue to be taken, they contain considerable deltas with respect to their previous ones, and the user is not initiating the cut-over operation, the system may decide to delay taking the next snapshot (e.g. in an exponential backoff manner), in order to avoid wasting costly bandwidth and/or compute resources. During this time, the delta may be periodically sampled to determine its size. If it turns out to be too big, e.g., it would generate a cut-over downtime that exceeds the increased cut-over threshold, then the cut-over threshold may be updated again, or the rate of taking further snapshots may be increased.

An additional aspect of the disclosure is a use case for determining a cut-over threshold. Since cut-over thresholds may come in various forms (e g minimum amount of target snapshots per VM, amount of data left to transfer etc.), the system may be configured to suggest, or even dynamically adjust the cut-over threshold such that it balances between (1) having the migration wave ever converge to be ready for cut-over, (2) lowering the time it takes to pass the cut-over threshold, and (3) the prospected amount of downtime, where all 3 may consider the threshold and/or any other affecting parameters.

For example, if the primary goal is minimizing the cut-over downtime the system can continuously (e.g., at a high frequency) or periodically keep taking and migrating snapshots until the cut-over operation is initiated. This way the cut-over downtime will be as low as possible, as the source will be kept up-to-date as closely and as fast as possible. However, additional limitations like "no more than X snapshots per VM" due to potential performance constraints or capping cut-over time to a certain point, will require finding the right balance between all the relevant parameters. This can be achieved through classic linear programming, like in the following example (values in bold are variables, values in italic are numbers provided by the user or calculated from the runtime environment):

---

Cut-over time can be defined as:
  T = cut_over_threshold_size / *network_bandwidth*
Consumed network traffic can also be defined as:
  N = *avg_delta_size* + *avg_delta_growth* * snapshot_frequency
while limiting:
  cut_over_threshold_size > 0 cut_over_threshold_size <
  *max_threshold_size* snapshot_frequency > 0
  snapshot_frequency < *max_snapshot_frequency*
Accordingly, the following expression can be defined as our "cost" function (cut-over time + consumed network traffic):
  B = T + *factor* * N, e.g.
  B = cut_over_threshold_size / *network_bandwidth*
    + *factor* * (*avg_delta_size* + *avg_delta_growth* * snapshot_frequency) The possible calculation here is based on either user-provided or environment-sensed parameters (marked in italic):
  *network_bandwidth* - sensed bandwidth or max allowed throughput
  *avg_delta_size* - typical rewrite rate per single snapshot period *avg_delta_growth* - typical amount of unique data for every snapshot period (e.g. data that is not rewritten over and over again)
  *max_threshold_size* - user-provided limits based on migration maintenance window
  *max_snapshot_frequency* - user-provided limits

---

Minimizing this "cost" function under the given constraints would produce the best balance between (A) the snapshot frequency after passing the cut-over threshold, (B) the cut-over time, and (C) the consumed network traffic.

As mentioned above, this expression can be minimized under the mentioned constraints through classic linear programming, e.g., by running the Simplex algorithm (or similar) on this input.

Unless otherwise stated, the foregoing alternative systems, methods and examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the

The invention claimed is:

1. A method for migrating computing resources from a source virtual machine to a migration destination virtual machine over a network, the method comprising:
   determining one or more migration parameters for launching a cut-over operation; and
   controlling, with at least one computing device coupled to the network, migration processing based on the one or more determined migration parameters to control timing of a cut-over request associated with replication-based migration of the computing resources,
   wherein the controlling comprises periodically creating and migrating memory snapshots to a migration destination, and
   wherein the controlling is based on a user-adjustable cut-over value defining how much of a given virtual machine's state remains to be replicated before issuing a cut-over operation and switching operations from the source virtual machine to the migration destination virtual machine.

2. The method of claim 1, wherein the computing resources comprise a first disk having storage areas associated with memory locations and the controlling migration processing comprises generating at least one command that causes data at a first memory location on the first disk and associated with a first virtual machine of one or more virtual machines to be transmitted to a second memory location of a second disk.

3. The method of claim 2, wherein the controlling migration processing comprises issuing at least one command that causes a second virtual machine to process data stored at the second memory location.

4. The method of claim 1, wherein the controlling migration processing comprises the at least one computing device generating at least one command that causes data at a first memory location associated with a first virtual machine of one or more virtual machines to be transmitted to a second memory location.

5. The method of claim 1, further comprising receiving a migration request that identifies one or more virtual machines associated with the computing resources.

6. The method of claim 1, wherein the migration parameters comprise at least one of a time to execute memory snapshots, a time to instantiate migration of the computing resources on a storage medium associated with a given virtual machine, and a time to instantiate cut-over of the given virtual machine.

7. The method of claim 1, further comprising outputting at least one of an estimated migration completion time, a percentage relating to a volume of data migrated, non-convergence data, and a threshold adjustment selection.

8. The method of claim 1, wherein the migration parameters comprise performance metrics including one or more of snapshot data, compressibility of the computing resources to be migrated, available bandwidth on the network, Changed Block Tables (CBT), and variance of each of one or more virtual machines.

9. The method of claim 1, wherein the migration parameters comprise performance metrics comprising one or more of a disk size, a disk rewrite rate, the user-adjustable cut-over value, a snapshot duration, and a network speed.

10. The method of claim 1, wherein the user-adjustable cut-over value is used to avoid a non-convergence replication-based migration process, and the controlling is further based on user-defined constraints comprising:
    a user-defined amount of network bandwidth available for the replication-based migration;
    a user-defined number of memory snapshots migrated per virtual machine of one or more virtual machines; and
    a user-defined cut-over downtime.

11. A computing system for migrating computing resources from a source virtual machine to a migration destination virtual machine over a network, comprising:
    one or more computing devices;
    one or more computer readable storage media; and
    program instructions, stored on the one or more computer readable storage media, for execution by at least one of the one or more computing devices, the program instructions causing the at least one computing device to:
    determine one or more migration parameters for launching a cut-over operation; and
    control migration processing based on the one or more determined migration parameters to control timing of one or more cut-over requests associated with replication- based migration of the computing resources,
    wherein the controlling causes the at least one computing device to periodically create and migrate memory snapshots to a migration destination, and
    wherein the controlling is based on a user-adjustable cut-over value defining how much of a given virtual machine's state remains to be replicated before issuing a cut-over operation and switching operations from the source virtual machine to the migration destination virtual machine.

12. The computing system of claim 11, further comprising a communications interface coupled to the at least one computing device and to the network, the communications interface receiving, over the network, one or more performance metrics associated with the one or more migration parameters and associated with one or more virtual machines.

13. The computing system of claim 12, wherein the performance metrics include one or more of snapshot data, compressibility of the computing resources to be migrated, available bandwidth on the network, Changed Block Tables (CBT), and variance of each of the one or more virtual machines.

14. The computing system of claim 11, wherein controlling migration processing further causes the at least one computing device to generate at least one command that causes a second virtual machine to process data stored at a second memory location.

15. The computing system of claim 11, wherein the migration parameters comprise at least one of a time to execute memory snapshots, a time to instantiate migration of one or more virtual machines and the computing resources on memory associated with a given virtual machine, and a time to instantiate cut-over of the given virtual machine.

16. The computing system of claim 11, wherein controlling migration processing further causes the at least one computing device to generate at least one command that causes data at a first memory location associated with a first virtual machine of one or more virtual machines to be stored for transmission to a second memory location.

17. A non-transient computer readable medium containing program instructions for migrating computing resources from a source virtual machine to a migration destination virtual machine over a network that, when executed by one or more computing devices, cause the one or more computing devices to:
- determine one or more migration parameters for launching a cut-over operation; and
- control migration processing, based on the one or more determined migration parameters to control timing of a cut-over request associated with replication-based migration of the computing resources,
- wherein the controlling causes the one or more computing devices to periodically create and migrate memory snapshots to a migration destination, and
- wherein the controlling is based on a user-adjustable cut-over value defining how much of a given virtual machine's state remains to be replicated before issuing a cut-over operation and switching operations from the source virtual machine to the migration destination virtual machine.

* * * * *